United States Patent
Upchurch et al.

(10) Patent No.: US 12,471,541 B2
(45) Date of Patent: Nov. 18, 2025

(54) METHODS AND COMPOSITIONS FOR THE PRODUCTION OF ECTOMYCORRHIZAL MYCELIA AND METHODS OF USE THEREOF

(71) Applicant: CAROLINA TRUFFIÉRES LLC, Fletcher, NC (US)

(72) Inventors: Davis M. Upchurch, Fletcher, NC (US); Brian L. Upchurch, Fletcher, NC (US)

(73) Assignee: CAROLINA TRUFFIÉRES LLC, Fletcher, NC (US)

( * ) Notice: Subject to any disclaimer, the term of this patent is extended or adjusted under 35 U.S.C. 154(b) by 130 days.

(21) Appl. No.: 17/631,907

(22) PCT Filed: Jul. 29, 2020

(86) PCT No.: PCT/US2020/044012
§ 371 (c)(1),
(2) Date: Feb. 1, 2022

(87) PCT Pub. No.: WO2021/030057
PCT Pub. Date: Feb. 18, 2021

(65) Prior Publication Data
US 2022/0287251 A1 Sep. 15, 2022

Related U.S. Application Data

(60) Provisional application No. 62/884,880, filed on Aug. 9, 2019.

(51) Int. Cl.
*A01G 18/10* (2018.01)
*A01G 18/20* (2018.01)
*A01H 17/00* (2006.01)

(52) U.S. Cl.
CPC ............. *A01G 18/10* (2018.02); *A01G 18/20* (2018.02); *A01H 17/00* (2013.01)

(58) Field of Classification Search
CPC ........ A01G 18/10; A01G 18/64; A01G 18/70; A01H 17/00
USPC ......................................................... 47/1.1
See application file for complete search history.

(56) References Cited

U.S. PATENT DOCUMENTS

| | | | |
|---|---|---|---|
| 4,127,965 A * | 12/1978 | Mee ........................ | A01G 18/70 47/1.1 |
| 5,554,530 A | 9/1996 | Fortin et al. | |
| 6,907,691 B2 * | 6/2005 | Miller .................... | A01G 18/00 47/1.1 |
| 7,608,760 B2 * | 10/2009 | Robles ................... | A01H 15/00 Plt./394 |
| 8,481,295 B2 | 7/2013 | Van et al. | |
| 9,277,760 B2 | 3/2016 | Splivallo | |
| 2013/0224741 A1 | 8/2013 | Martin et al. | |

FOREIGN PATENT DOCUMENTS

| | | | |
|---|---|---|---|
| CN | 101724564 B | | 6/2010 |
| CN | 107488624 A | | 12/2017 |
| CN | 109575150 | * | 4/2019 |
| EP | 2982241 A1 | | 2/2016 |
| ES | 2088363 B1 | | 8/1996 |
| ES | 2387666 A1 | | 9/2012 |
| FR | 1408517 A | | 8/1965 |
| JP | H10127164 A | | 5/1998 |
| JP | 2012080811 A | | 4/2012 |
| WO | 2009136049 A1 | | 11/2009 |
| WO | 2012110673 A1 | | 8/2012 |
| WO | 2018114751 A1 | | 6/2018 |

OTHER PUBLICATIONS

Arenas, Francisco, et al., "Mycelium of Terfezia claveryi as inoculum source to produce plants", Mycorrhiza, 2018, 691-701.
Bonito, Gregory Michael, "Systematics and Ecology of Truffles (Tuber)", A Dissertation in Biology, 2009.
Iotti, Micro, et al., "First evidence for truffle production from plants inoculated with mycelial pure cultures", Mycorrhiza, 2016, 793-798.
Iotti, Micro, et al., "Techniques for Host Plant Inoculation with Truffles and Other Edible Ectomycorrhizal Mushrooms", Soil Biology, vol. 34, 2012, 145-161.
Le Tacon, Francois, et al., "Certainties and uncertainties about the life cycle of the Perigord black truffle (*Tuber melanosporum* Vittad.)", Annals of Forest Science. 73:105-117 (2016).
Linde, C. C., et al., "Genetic Diversity and Mating Type Distribution of Tuber melanosporum and Their Significance to Truffle Cultivation in Artificially Planted Truffieres in Australia", Applied and Environmental Microbiology. 78 (18):6534-6539 (2012).
Paolocci, Francesco, et al., "Rapid molecular approach for a reliable identification of *Tuber* spp. *ectomycorrhizae*", FEMS Microbiology Ecology 28, 1999, 23-30.
Piattoni, Federica, et al., "Viability and Infectivity of Tuber borchii After Cryopreservation", CryoLetters 38, 2017, 58-64.
Riccioni, Claudia, et al., "Tuber melanosporum outcrosses: analysis of the genetic diversity within and among its natural populations under this new scenario", New Phytologist. 180:466-478 (2008).
Rubini, A, et al., "Isolation and characterization of MAT genes in the symbiotic ascomycete Tuber melanosporum", New Phytol. 189(3):710-722 (2011) (including Suppl Materials and Figures).
Rubini, Andrea, et al., "Tuber melanosporum: mating type distribution in a natural plantation and dynamics of strains of different mating types on the roots of nursery-inoculated host plants", New Phytologist. 189:723-735 (2011).

(Continued)

*Primary Examiner* — David J Parsley
(74) *Attorney, Agent, or Firm* — Myers Bigel, P.A.

(57) ABSTRACT

The invention relates to methods of cultivating ectomycorrhizal fungi, the method comprising incubating ectomycorrhizal MAT1-1 mycelia, ectomycorrhizal MAT1-2 mycelia, and ectomycorrhizal male mycelia in a culture medium for about 1 day to about 50 days, thereby cultivating ectomycorrhizal fungi to produce an ectomycorrhizal fungal biomass comprising MAT1-1 ectomycorrhizal mycelia, MAT1-2 ectomycorrhizal mycelia, and male ectomycorrhizal mycelia. Also provided are methods of use of the ectomycorrhizal mycelial biomass.

27 Claims, No Drawings

Specification includes a Sequence Listing.

(56) References Cited

OTHER PUBLICATIONS

Wenkart, S., et al., "Mycorrhizal associations between Tuber melanosporum mycelia and transformed roots of Cistus incanus", Plant Cell Reports, 2001, 369-373.

Zambonelli, Alessandra, et al., "Current status of truffle cultivation: recent results and future perspectives", Micologia Italiana vol. 44, 2015.

Zampieri, Elisa, et al., "PCR primers specific for the genus Tuber reveal the presence of several truffle species in a truffle-ground", FEMS Microbiology Letters. 297:67-72 (2009).

International Search Report and Written Opinion corresponding to International Application No. PCT/US20/44012, mailed Oct. 20, 2020, 9 pages.

Rossi et al. "Inoculum production of the ectomycorrhizal fungus *Pisolithusmicrocarpus* in an airlift bioreactor" Appl Microbiol Biotechnol, 59:175-181, 2002 abstract only.

Extended European Search Report corresponding to EP 20851749.0; dated Aug. 25, 2023 (8 pages).

De La Varga, Herminia, et al. "Five years investigation of female and male genotypes in perigord black truffle (*Tuber melanosporum* Vittad.) revealed contrasted reproduction strategies", Environmental Microbiology 19(7): 2604-2615 (2017).

Bellemain, et al., "ITS as an environmental DNA barcode for fungi: an in silico approach reveals potential PCR biases", BMC Microbiology 10:189, 2010 (9 pages).

Cracraft, et al., "The Fungi", Assembling the Tree of Life, Chapter 12: 171-194, 2004.

Gardes, et al., "ITS primers with enhanced specificity for basidiomycetes—application to the identification of mycorrhizae and rusts", Molecular Energy 2: 113-118, 1993.

Grupe II, et al., "Tuber brennemanii and Tuber floridanum: Two new *Tuber* species are among the most commonly detected ectomycorrhizal taxa within commercial pecan (*Carya illinoinensis*) orchards", Mycologia 110(4): 780-790, 2018.

Iotti, et al., "Self/nonself recognition in Tuber melanosporum is not mediated by a heterokaryon incompatibility system", Fungal Biology 116: 261-275, 2012.

Kauserud, et al., "ITS alchemy: On the use of ITS as a DNA marker in fungal ecology", Fungal Ecology 6:101274, 2023 (11 pages).

Martinez De Aragon, et al., "Economically profitable post fire restoration with black truffle (*Tuber melanosporum*) producing plantations", New Forests 43: 615-630, 2012.

Murat, et al., "Polymorphism at the ribosomal DNA ITS and its relation to postglacial re-colonization routes of the Perigord truffle *Tuber melanosporum*", New Phytologist 164: 401-411, 2004.

Rubini, et al., "Impact of the competition between mating types on the cultivation of Tuber melanosporum: Romeo and Juliet and the matter of space and time", Mycorrhiza 24: 19-27, 2014.

Selosse, et al., "Black Truffle, a Hermaphrodite with Forced Unisexual Behaviour", Trends in Microbiology 25(10): p. 784-787, 2017.

\* cited by examiner

METHODS AND COMPOSITIONS FOR THE PRODUCTION OF ECTOMYCORRHIZAL MYCELIA AND METHODS OF USE THEREOF

STATEMENT REGARDING ELECTRONIC FILING OF A SEQUENCE LISTING

A Sequence Listing in ASCII text format, submitted under 37 C.F.R. § 1.821, entitled 1532-2WO_ST25.txt, 3063 bytes in size, generated on Jul. 27, 2020 and filed via EFS-Web, is provided in lieu of a paper copy. This Sequence Listing is hereby incorporated herein by reference into the specification for its disclosures.

STATEMENT OF PRIORITY

This application claims the benefit, under 35 U.S.C. § 119 (e), of U.S. Provisional Application No. 62/884,880 filed on Aug. 9, 2019, the entire contents of which is incorporated by reference herein.

FIELD OF THE INVENTION

The invention relates to methods for cultivating ectomycorrhizal mycelium and methods of use thereof for inoculating seeds, seedlings and trees.

BACKGROUND OF THE INVENTION

Ectomycorrhizal fungi include fungal genera that produce truffles. There are several hundred species of truffles, but less than ten are commercially important. Truffles form symbiotic relationships with certain host tree species. "Truffle groves" or "truffière" (e.g., truffle orchard, truffle ground, truffle plantation) are established by mycorrhizing (infecting, inoculating) ectomycorrhizal host trees. The typical tree species used are in the genus *Quercus* (oak) and the genus *Corylus* (filbert or hazels), but may also include species in the genera of *Pinus, Carpinus, Castanea*, and others. Mycorrhizing is accomplished by introducing spores of the desired truffle species to the emerging roots of a seed of desired host tree species in a controlled environment. Less commonly rooted cuttings or tissue culture may be used rather than seeds. Infected trees are then out-planted to establish truffle orchards. The primary method of mycorrhizing tree seedlings is to collect spores from mature truffles, and incorporate them into a sterile substrate consisting of one or more of peat moss, perlite, vermiculite, lime, and calcium carbonate screenings in variable ratios. This can be done with freeze dried spores, spore slurry, or other similar methods that introduce spores to the substrate in which seeds are placed, thereby infecting the roots of seedlings in peat moss, perlite, vermiculite, lime, and calcium carbonate screenings as they emerge from the seed. This method takes about 6 months or more to effectively mycorrhize the seedlings. During this time, there is considerable risk of contamination of the substrate with, for example, undesirable fungi. Contamination can reduce mycorrhization with the desired species, resulting in reduced seedling quality. Seedlings may be unmarketable if contamination levels are too high. In addition, this method can be costly since mature truffles are utilized. Truffles commonly sell for $500 to $1500 per pound, and occasionally considerably more. Further, in order to ensure the correct species of truffle is used, each individual truffle is DNA tested for positive identification prior to making inoculum, which results in additional costs.

More efficient and effective methods are needed for cultivating ectomycorrhizal mycelia for mycorrhizing trees and producing truffles.

SUMMARY OF THE INVENTION

One aspect of the invention provides a method of cultivating ectomycorrhizal fungi, the method comprising: incubating ectomycorrhizal MAT1-1 mycelia, ectomycorrhizal MAT1-2 mycelia, and ectomycorrhizal male mycelia in a culture medium for about 3 days to about 50 days, thereby cultivating ectomycorrhizal fungi to produce an ectomycorrhizal fungal biomass.

A second aspect of the invention provides a method of producing a substrate for planting a seed or a seedling, the method comprising inoculating the substrate with a liquid suspension comprising the ectomycorrhizal mycelial biomass of the invention, thereby producing a substrate for planting a seed or seedling.

A third aspect of the invention provides a method of colonizing roots of a seedling with ectomycorrhizal mycelia, the method comprising: inoculating a seed with a liquid suspension comprising the ectomycorrhizal mycelial biomass of the invention, and germinating the seed to produce a seedling, thereby colonizing the roots of the seedling.

A fourth aspect of the invention provides a method of colonizing roots of a seedling with ectomycorrhizal mycelia, the method comprising inoculating a seedling with a liquid suspension comprising the ectomycorrhizal mycelial biomass of the invention, thereby colonizing the roots of the seedling, A fifth aspect of the invention provides a method of colonizing roots of a seedling with ectomycorrhizal mycelia, the method comprising: inoculating a substrate for planting a seed and/or seedling with a liquid suspension comprising the ectomycorrhizal mycelial biomass of the invention to produce an inoculated substrate; and (a) planting the seedling in the inoculated substrate, thereby colonizing the roots of the seedling, and/or (b) planting a seed in the inoculated substrate; and germinating the seed to produce a seedling, thereby colonizing the roots of the seedling.

A sixth aspect of the invention provides a method of increasing truffle production by a tree, the method comprising inoculating a tree or a substrate (e.g., soil) in the root zone of the tree with a liquid suspension comprising the ectomycorrhizal mycelial biomass of the invention, thereby increasing the truffle production of the tree.

The invention further provides ectomycorrhizal mycelial biomass produced by the methods of the invention, as well as seeds, seedlings, and substrate inoculated and/or colonized by ectomycorrhizal mycelia from the ectomycorrhizal mycelial biomass of the invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measureable value may include any other range and/or individual value therein.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

It will also be understood that, as used herein, the terms example, exemplary, and grammatical variations thereof are intended to refer to non-limiting examples and/or variant embodiments discussed herein, and are not intended to indicate preference for one or more embodiments discussed herein compared to one or more other embodiments.

As used herein, the terms "increase," "increasing," "increased," "enhance," "enhanced," "enhancing," and "enhancement" (and grammatical variations thereof) describe an elevation of at least about 10%, 15%, 20%, 25%, 30%, 40%, 50%, 75%, 100%, 150%, 200%, 300%, 400%, 500% or more as compared to a control. Thus, in some aspects of the present invention, the amount of ectomycorrhizal mycelia produced using a method of the invention may be increased as compared to art known methods of producing the same.

As used herein, the terms "reduce," "reduced," "reducing," "reduction," "diminish," and "decrease" (and grammatical variations thereof), describe, for example, a decrease of at least about 5%, 10%, 15%, 20%, 25%, 35%, 50%, 75%, 80%, 85%, 90%, 95%, 97%, 98%, 99%, or 100% as compared to a control. In particular embodiments, the reduction can result in no or essentially no (i.e., an insignificant amount, e.g., less than about 10% or even 5%) detectable activity or amount.

As used herein, the terms "nucleic acid," "nucleic acid molecule," "nucleotide sequence" and "polynucleotide" refer to RNA or DNA that is linear or branched, single or double stranded, or a hybrid thereof. The term also encompasses RNA/DNA hybrids. When dsRNA is produced synthetically, less common bases, such as inosine, 5-methylcytosine, 6-methyladenine, hypoxanthine and others can also be used for antisense, dsRNA, and ribozyme pairing. For example, polynucleotides that contain C-5 propyne analogues of uridine and cytidine have been shown to bind RNA with high affinity and to be potent antisense inhibitors of gene expression. Other modifications, such as modification to the phosphodiester backbone, or the 2'-hydroxy in the ribose sugar group of the RNA can also be made.

As used herein, the term "nucleotide sequence" refers to a heteropolymer of nucleotides or the sequence of these nucleotides from the 5' to 3' end of a nucleic acid molecule and includes DNA or RNA molecules, including cDNA, a DNA fragment or portion, genomic DNA, synthetic (e.g., chemically synthesized) DNA, plasmid DNA, mRNA, and anti-sense RNA, any of which can be single stranded or double stranded. The terms "nucleotide sequence" "nucleic acid," "nucleic acid molecule," "nucleic acid construct," "oligonucleotide" and "polynucleotide" are also used interchangeably herein to refer to a heteropolymer of nucleotides. Nucleic acid molecules and/or nucleotide sequences provided herein are presented herein in the 5' to 3' direction, from left to right and are represented using the standard code for representing the nucleotide characters as set forth in the U.S. sequence rules, 37 CFR §§ 1.821-1.825 and the World Intellectual Property Organization (WIPO) Standard ST.25. A "5' region" as used herein can mean the region of a polynucleotide that is nearest the 5' end of the polynucleotide. Thus, for example, an element in the 5' region of a polynucleotide can be located anywhere from the first nucleotide located at the 5' end of the polynucleotide to the nucleotide located halfway through the polynucleotide. A "3' region" as used herein can mean the region of a polynucleotide that is nearest the 3' end of the polynucleotide. Thus, for example, an element in the 3' region of a polynucleotide can be located anywhere from the first nucleotide located at the 3' end of the polynucleotide to the nucleotide located halfway through the polynucleotide.

As used herein with respect to nucleic acids, the term "fragment" or "portion" refers to a nucleic acid that is reduced in length relative (e.g., reduced by 1, 2, 3, 4, 5, 6, 7, 8, 9, 10, 11, 12, 13, 14, 15, 16, 17, 18, 19, 20, 20, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 400, 450, 500, 550, 600, 650, 700, 750, 800, 850, or 900 or more nucleotides or any range or value therein) to a reference nucleic acid and that comprises, consists essentially of and/or consists of a nucleotide sequence of contiguous nucleotides identical or almost identical (e.g., 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identical) to a corresponding portion of the reference nucleic acid. Such a nucleic acid fragment may be, where appropriate, included in a larger polynucleotide of which it is a constituent.

As used herein with respect to polypeptides, the term "fragment" or "portion" may refer to a polypeptide that is reduced in length relative to a reference polypeptide and that comprises, consists essentially of and/or consists of an amino acid sequence of contiguous amino acids identical or almost identical (e.g., 90%, 91%, 92%, 93%, 94%, 95%, 96%, 97%, 98%, 99% identical) to a corresponding portion of the reference polypeptide. Such a polypeptide fragment may be, where appropriate, included in a larger polypeptide of which it is a constituent. In some embodiments, the polypeptide fragment comprises, consists essentially of or consists of at least about 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 125, 150, 175, 200, 225, 250, 300, 350, 400 or more consecutive amino acids of a reference polypeptide.

The term "gene," as used herein, refers to a nucleic acid molecule capable of being used to produce mRNA, antisense RNA, miRNA, anti-microRNA antisense oligodeoxyribonucleotide (AMO) and the like. Genes may or may not be capable of being used to produce a functional protein or gene product. Genes can include both coding and non-coding regions (e.g., introns, regulatory elements, promoters, enhancers, termination sequences and/or 5' and 3' untranslated regions). A gene may be "isolated" by which is meant a nucleic acid that is substantially or essentially free from components normally found in association with the nucleic acid in its natural state. Such components include other cellular material, culture medium from recombinant production, and/or various chemicals used in chemically synthesizing the nucleic acid.

The terms "complementary" or "complementarity," as used herein, refer to the natural binding of polynucleotides under permissive salt and temperature conditions by base-pairing. For example, the sequence "A-G-T" (5' to 3') binds to the complementary sequence "T-C-A" (3' to 5'). Complementarity between two single-stranded molecules may be "partial," in which only some of the nucleotides bind, or it may be complete when total complementarity exists between the single stranded molecules. The degree of complementarity between nucleic acid strands has significant effects on the efficiency and strength of hybridization between nucleic acid strands.

"Complement," as used herein, can mean 100% complementarity with the comparator nucleotide sequence or it can mean less than 100% complementarity (e.g., about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, and the like, complementarity) to the comparator nucleotide sequence.

Different nucleic acids or proteins having homology are referred to herein as "homologues." The term homologue includes homologous sequences from the same and from other species and orthologous sequences from the same and other species. "Homology" refers to the level of similarity between two or more nucleic acid and/or amino acid sequences in terms of percent of positional identity (i.e., sequence similarity or identity). Homology also refers to the concept of similar functional properties among different nucleic acids or proteins. Thus, the compositions and methods of the invention further comprise homologues to the nucleotide sequences and polypeptide sequences of this invention. "Orthologous," as used herein, refers to homologous nucleotide sequences and/or amino acid sequences in different species that arose from a common ancestral gene during speciation. A homologue of a nucleotide sequence of this invention has a substantial sequence identity (e.g., at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.5% or 100%) to said nucleotide sequence of the invention.

As used herein "sequence identity" refers to the extent to which two optimally aligned polynucleotide or polypeptide sequences are invariant throughout a window of alignment of components, e.g., nucleotides or amino acids. "Identity" can be readily calculated by known methods including, but not limited to, those described in: *Computational Molecular Biology* (Lesk, A. M., ed.) Oxford University Press, New York (1988); *Biocomputing: Informatics and Genome Projects* (Smith, D. W., ed.) Academic Press, New York (1993); *Computer Analysis of Sequence Data, Part I* (Griffin, A. M., and Griffin, H. G., eds.) Humana Press, New Jersey (1994); *Sequence Analysis in Molecular Biology* (von Heinje, G., ed.) Academic Press (1987); and *Sequence Analysis Primer* (Gribskov, M. and Devereux, J., eds.) Stockton Press, New York (1991).

As used herein, the term "percent sequence identity" or "percent identity" refers to the percentage of identical nucleotides in a linear polynucleotide sequence of a reference ("query") polynucleotide molecule (or its complementary strand) as compared to a test ("subject") polynucleotide molecule (or its complementary strand) when the two sequences are optimally aligned. In some embodiments, "percent sequence identity" can refer to the percentage of identical amino acids in an amino acid sequence as compared to a reference polypeptide.

As used herein, the phrase "substantially identical," or "substantial identity" in the context of two nucleic acid molecules, nucleotide sequences, or polypeptide sequences, refers to two or more sequences or subsequences that have at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.5% or 100% nucleotide or amino acid residue identity, when compared and aligned for maximum correspondence, as measured using one of the following sequence comparison algorithms or by visual inspection. In some embodiments of the invention, the substantial identity exists over a region of consecutive nucleotides of a nucleotide sequence of the invention that is about 10 nucleotides to about 20 nucleotides, about 10 nucleotides to about 25 nucleotides, about 10 nucleotides to about 30 nucleotides, about 15 nucleotides to about 25 nucleotides, about 30 nucleotides to about 40 nucleotides, about 50 nucleotides to about 60 nucleotides, about 70 nucleotides to about 80 nucleotides, about 90 nucleotides to about 100 nucleotides, about 100 nucleotides to about 200 nucleotides, about 100 nucleotides to about 300 nucleotides, about 100 nucleotides to about 400 nucleotides, about 100 nucleotides to about 500 nucleotides, about 100 nucleotides to about 600 nucleotides, about 100 nucleotides to about 800 nucleotides, about 100 nucleotides to about 900 nucleotides, or more in length, or any range therein, up to the full length of the sequence. In some embodiments, nucleotide sequences can be substantially identical over at least about 20 nucleotides (e.g., about 20, 21, 22, 23, 24, 25, 26, 27, 28, 29, 30, 31, 32, 33, 34, 35, 36, 37, 38, 39, 40, 50, 60, 70, or 80 nucleotides or more).

For sequence comparison, typically one sequence acts as a reference sequence to which test sequences are compared. When using a sequence comparison algorithm, test and reference sequences are entered into a computer, subsequence coordinates are designated if necessary, and sequence algorithm program parameters are designated. The sequence comparison algorithm then calculates the percent sequence identity for the test sequence(s) relative to the reference sequence, based on the designated program parameters.

Optimal alignment of sequences for aligning a comparison window are well known to those skilled in the art and may be conducted by tools such as the local homology algorithm of Smith and Waterman, the homology alignment algorithm of Needleman and Wunsch, the search for similarity method of Pearson and Lipman, and optionally by computerized implementations of these algorithms such as GAP, BESTFIT, FASTA, and TFASTA available as part of the GCG® Wisconsin Package® (Accelrys Inc., San Diego, CA). An "identity fraction" for aligned segments of a test sequence and a reference sequence is the number of identical components which are shared by the two aligned sequences divided by the total number of components in the reference sequence segment, e.g., the entire reference sequence or a smaller defined part of the reference sequence. Percent sequence identity is represented as the identity fraction multiplied by 100. The comparison of one or more polynucleotide sequences may be to a full-length polynucleotide sequence or a portion thereof, or to a longer polynucleotide sequence. For purposes of this invention "percent identity" may also be determined using BLASTX version 2.0 for translated nucleotide sequences and BLASTN version 2.0 for polynucleotide sequences.

Two nucleotide sequences may also be considered substantially complementary when the two sequences hybridize to each other under stringent conditions. In some embodiments, two nucleotide sequences considered to be substantially complementary hybridize to each other under highly stringent conditions.

"Stringent hybridization conditions" and "stringent hybridization wash conditions" in the context of nucleic acid hybridization experiments such as Southern and Northern hybridizations are sequence dependent, and are different under different environmental parameters. An extensive guide to the hybridization of nucleic acids is found in Tijssen *Laboratory Techniques in Biochemistry and Molecular Biology-Hybridization with Nucleic Acid Probes* part I chapter 2 "Overview of principles of hybridization and the strategy of nucleic acid probe assays" Elsevier, New York (1993). Generally, highly stringent hybridization and wash conditions are selected to be about 5° C. lower than the thermal melting point ($T_m$) for the specific sequence at a defined ionic strength and pH.

The $T_m$ is the temperature (under defined ionic strength and pH) at which 50% of the target sequence hybridizes to a perfectly matched probe. Very stringent conditions are selected to be equal to the $T_m$ for a particular probe. An example of stringent hybridization conditions for hybridization of complementary nucleotide sequences which have more than 100 complementary residues on a filter in a Southern or northern blot is 50% formamide with 1 mg of heparin at 42° C., with the hybridization being carried out overnight. An example of highly stringent wash conditions is 0.1 5M NaCl at 72° C. for about 15 minutes. An example of stringent wash conditions is a 0.2×SSC wash at 65° C. for 15 minutes (see, Sambrook, infra, for a description of SSC buffer). Often, a high stringency wash is preceded by a low stringency wash to remove background probe signal. An example of a medium stringency wash for a duplex of, e.g., more than 100 nucleotides, is 1×SSC at 45° C. for 15 minutes. An example of a low stringency wash for a duplex of, e.g., more than 100 nucleotides, is 4-6×SSC at 40° C. for 15 minutes. For short probes (e.g., about 10 to 50 nucleotides), stringent conditions typically involve salt concentrations of less than about 1.0 M Na ion, typically about 0.01 to 1.0 M Na ion concentration (or other salts) at pH 7.0 to 8.3, and the temperature is typically at least about 30° C. Stringent conditions can also be achieved with the addition of destabilizing agents such as formamide. In general, a signal to noise ratio of 2× (or higher) than that observed for an unrelated probe in the particular hybridization assay indicates detection of a specific hybridization. Nucleotide sequences that do not hybridize to each other under stringent conditions are still substantially identical if the proteins that they encode are substantially identical. This can occur, for example, when a copy of a nucleotide sequence is created using the maximum codon degeneracy permitted by the genetic code.

As used herein, the terms "mycorrhize," "mycorrhization" and grammatical variations thereof, refer to the infection or colonization (e.g., symbiotic colonization) of tree roots by ectomycorrhizal mycelium (e.g., ectomycorrhizal MAT1-1 mycelia (also described as MAT1, MAT1-1-1), ectomycorrhizal MAT1-2 mycelia (also described as MAT2, MAT1-2-1), and ectomycorrhizal male mycelia as described herein). The term, "mycorrhized" as used herein refers to tree roots that are infected by the ectomycorrhizal mycelium.

The new method of mycorrhization of the present invention described herein utilizes truffle mycelia rather than truffle spores to infect host trees and substrate for growing seeds, seedlings and trees. Initially, the mycelia may be obtained using spores, but once this is accomplished, an unlimited amount of mycelia can be produced using, for example, a bioreactor. Thus, mature truffles are no longer needed except in the initial step. Thus, using the methods of the invention as little as one small truffle piece (e.g., 1, 2, 3, 4, 5 or more pieces) may be used to inoculate a great many trees (e.g., 5, 10, 15, 20, 25, 30, 35, 40, 50, 60, 70, 80, 90, 100 or more trees).

Advantages of the methods of the invention may include, for example:
a) Reduction or elimination of inoculum contamination by undesirable truffle species or competitive/undesirable ectomycorrhizal fungi (e.g., ectomycorrhizal fungi other than those that are intended to be incubated as disclosed herein (e.g., *Sphaerosporella* spp., *Thelephora* spp., *Scleroderma* spp.));
b) Reduced cost to inoculate tree seedlings since mature truffles are no longer needed for mycorrhization. The cost is estimated to be about 5% of that for traditional prior known production methods.
c) DNA testing is performed only at the very beginning of the production process rather than throughout as for traditional, prior art processes, thereby further reducing costs.
d) Mycorrhization is accomplished much more quickly, significantly reducing the risk of contamination in the process. Rather than trees and seedlings being inoculated with spores which then need to germinate to produce mycelia for colonization of trees/seedlings, the mycelia is the inoculum and therefore is present immediately and can grow and infect roots before the roots are exposed to and infected by undesirable truffle species.
e) Superior, specific strains with desirable characteristics can be identified and the mycelia from these strains grown, and used to mycorrhize trees. Such characteristics include mating type, better production yields, better flavor and/or aroma (e.g., improved organoleptic properties), better drought or moisture tolerance, better shape or size, etc. Current methods do not allow for such selection.
f) The mycelia produced using the methods of the invention can be utilized to boost mycelia in the soil of existing orchards to maximize truffle production. Current prior art methods for mycorrhization of existing orchards are only done using spores, which is very expensive.

In some embodiments, the present invention provides a method of cultivating ectomycorrhizal fungi, the method comprising incubating ectomycorrhizal MAT1-1 mycelia (also described as MAT1, MAT1-1-1), ectomycorrhizal MAT1-2 mycelia (also described as MAT2, MAT1-2-1), and ectomycorrhizal male mycelia in a culture medium (e.g., a first culture medium), thereby cultivating ectomycorrhizal fungi to produce an ectomycorrhizal fungal biomass comprising MAT1-1 ectomycorrhizal mycelia, MAT1-2 ectomycorrhizal mycelia, and male ectomycorrhizal mycelia (e.g., cultivated mycorrhizal fungi comprising MAT1-1 ectomycorrhizal mycelia, MAT1-2 ectomycorrhizal mycelia, and male ectomycorrhizal mycelia). In some embodiments, incubating may be for about 3 days to about 50 days (e.g., about 3 days to about 20 days, about 3 days to about 30 days, about 3 days to about 40 days, about 3 days to about 50 days, about 5 days to about 20 days, about 5 days to about 30 days, about 5 days to about 40 days, about 5 days to about 50 days, about 7 days to about 20 days, about 7 days to about 30 days, about 7 days to about 40 days, about 7 days to about 50 days, about 9 days to about 20 days, about 9 days to about 30 days, about 9 days to about 40 days, about 9 days to about 50 days, about 10 days to about 20 days, about 10 days to about 30 days, about 10 days to about 40 days, about 10 days to about 50 days, about 12 days to about 20 days, about 12 days to about 30 days, about 12 days to about 40 days, about 12 days to about 50 days, about 15 days to about 20 days, about 15 days to about 30 days, about 15 days to about 40 days, about 15 days to about 50 days (e.g., about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 day(s) or any range or value therein). In some embodiments, the incubating may be for 15 days.

In some embodiments, the method of cultivating ectomycorrhizal fungi may comprise inoculating the culture medium with MAT1-1 ectomycorrhizal mycelia, MAT1-2 ectomycorrhizal mycelia, and male ectomycorrhizal mycelia prior to incubating. In some embodiments, the MAT1-1 ectomycorrhizal mycelia, MAT1-2 ectomycorrhizal mycelia, and male ectomycorrhizal mycelia may be isolated and characterized prior to inoculating the culture medium.

In some embodiments, inoculating the culture medium with MAT1-1 ectomycorrhizal mycelia, MAT1-2 ectomycorrhizal mycelia, and male ectomycorrhizal mycelia prior to incubating comprises inoculating the culture medium with mycorrhized roots (e.g., roots of trees infected with ectomycorrhizal mycelia; e.g., infected with MAT1-1 ectomycorrhizal mycelia, MAT1-2 ectomycorrhizal mycelia, and male ectomycorrhizal mycelia). In some embodiments, the mycorrhized/infected roots are cultured (e.g., cultured, for example, on culture plates) prior to being inoculated into the culture medium. In some embodiments, the mycorrhized roots are morphologically tested for correct species colonization via, for example, a stereomicroscope and/or by PCR testing of individual root tips using, for example, the primers described herein. In some embodiments, the roots may be cleaned and surface sterilized prior to inoculating the culture medium. As an example, mycorrhized roots may be cleaned and sterilized by placing the roots into a water bath where they may be rinsed with water to remove soil particles. The roots may then be removed from the water bath and immersed in an aqueous solution of 10-60% v/v Hydrogen Peroxide ($H_2O_2$) (e.g., about 10, 15, 20, 25, 30, 35, 40, 45, 50, 55, 60% v/v $H_2O_2$, or about 20% to about 45% v/v $H_2O_2$, 25% to 40% v/v $H_2O_2$, optionally about 30% v/v $H_2O_2$). The sterilized roots are then aseptically transferred into the culture medium (e.g., the bioreactor chamber) to cultivate the ectomycorrhizal fungi and produce an ectomycorrhizal fungal biomass comprising MAT1-1 ectomycorrhizal mycelia, MAT1-2 ectomycorrhizal mycelia, and male ectomycorrhizal mycelia (e.g., cultivated mycorrhizal fungi comprising MAT1-1 ectomycorrhizal mycelia, MAT1-2 ectomycorrhizal mycelia, and male ectomycorrhizal mycelia). The amount of mycorrhized tree roots that may be used to inoculate a culture medium is in the range of about 1 g to about 100 g (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g or any range or value therein). In some embodiments, the amount of mycorrhized tree roots that may be used to inoculate a culture medium may be in the range of about 1 g to about 10 g, about 1 g to about 20 g, about 1 g to about 30 g, about 1 g to about 40 g, about 1 g to about 50 g, about 1 g to about 60 g, about 1 g to about 70 g, about 1 g to about 80 g, or about 1 gr to about 90 g or any range or value therein. In some embodiments, the amount of mycorrhized tree roots that may be used to inoculate a culture medium may be in the range of about 1, 2, 3, 4, 5, 6, 7, 8, 9 g to about 10, 11, 12, 13, 14, 15, 16, 17, 18, 19, or 20 g, or about 1, 2, 3, 4, or 5 g to about 6, 7, 8, 9, or 10 g. In some embodiments, the amount of mycorrhized tree roots used to inoculate a culture medium is about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or about 5 g, or any range or value therein. In some embodiments, the amount of mycorrhized tree roots used to inoculate a culture medium is about 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or about 10 g, or any range or value therein.

As would be understood by those of skill in the art, roots from any tree capable of being infected with the MAT1-1 ectomycorrhizal mycelia, MAT1-2 ectomycorrhizal mycelia, and male ectomycorrhizal mycelia as described herein may be used. Such trees include, but are not limited to, those in the plant families or subfamilies of Betulaceae, Corylaceae, Cistaceae, Dipterocarpaceae, Fagaceae, Fabaceae, Pinaceae, Ericacaea, Juglandacaea, Malvacaea, Myrtacaea, Nothofagacaea, Rosacaea, Salicacaea, Tiliaceae, Rhamnacae, Laricoideae, or Pinoideae, as described herein.

In some embodiments, the biomass of mycorrhized roots may be increased by transforming the roots into hairy-root system. The roots of a hairy-root system useful with this invention may be infected with ectomycorrhizal mycelia (e.g., infected with MAT1-1 ectomycorrhizal mycelia, MAT1-2 ectomycorrhizal mycelia, and male ectomycorrhizal mycelia as described herein) prior to being generated into a hairy-root system or a hairy-root system may be generated from any tree species capable of being infected with ectomycorrhizal mycelia and the roots of the hairy-root system once generated may then be infected with the ectomycorrhizal mycelia.

Methods for transforming roots into hairy-root systems are known in the art. As an example, a seedling having roots that are infected with the MAT1-1 ectomycorrhizal mycelia, MAT1-2 ectomycorrhizal mycelia, and male ectomycorrhizal mycelia (as described herein) may be infected with an *Agrobacterium* spp., optionally by one or more strains of *Agrobacterium rhizogenes*, thereby producing a transgenic hairy-root system attached to the non-transformed stems, leaves, and bud of the seedling. The hairy root system thus allows the clonal propagation of the hairy roots infected with the ectomycorrhizal mycelia. In some embodiments, the root system of a seedling may be removed and the seedling inoculated at the epicotyl with the bacteria (e.g., *A. rhizogenes*). The de-rooted seedling then regenerates roots that are a hairy root system. This hairy-root system may then be inoculated with the ectomycorrhizal mycelia (e.g., the MAT1-1 ectomycorrhizal mycelia, MAT1-2 ectomycorrhizal mycelia, and male ectomycorrhizal mycelia), thereby generating an increased biomass of mycorrhized roots for use in inoculating a culture medium as described herein.

Roots from a hairy-root system colonized by the ectomycorrhizal mycelia may be cultured on solid media (e.g., an agar medium, as described herein). When cultured on a solid medium, the hairy root system may be sub-cultured about every 4-16 weeks (e.g., about 4, 5, 6, 7, 8, 9, 10, 11, 12, 13, 14, 15, 16 weeks). In some embodiments, sub-culturing is repeated once every 4-16 weeks. In some embodiments, a hairy root system may be sub-cultured during exponential growth phase and exponential growth phase and thus, sub-culturing may occur about every 4-16 weeks.

In some embodiments, a hairy root system generated as described herein may be treated with a low dose of an antibiotic (e.g., streptomycin) (about 10 mg/L to about 40 mg/L, e.g., about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mg/L, or any range or value therein, optionally about 15 mg/L to about 25 mg/L or about 20 mg/L) to kill the bacteria (e.g., *A. rhizogenes*). However, *A. rhizogenes* generally does not grow well in liquid culture and therefore, does not compete well with the growth of the ectomycorrhizal mycelia in a bioreactor. Consequently, treatment with an antibiotic is generally unnecessary.

In some embodiments, the methods of the present invention provide about a hundred fold increase or more in the amount of ectomycorrhizal mycelia over the amount added/inputted/inoculated into the culture medium. Thus, as an example, inoculation of about 10 mg, 20 mg, 30 mg, 40 mg, 50 mg, 60 mg, 70 mg, 80 mg, 90 mg, or 100 mg of mycelia into a culture medium produces about 1 g, 2 g, 3 g, 4 g, 5 g, 6 g, 7 g, 8 g, 9 g, or 10 g of mycelia, respectively; inoculation of about 200 mg, 300 mg, 400 mg, 500 mg, 600 mg, 700 mg, 800 mg, 900 mg, or 1000 mg, of mycelia into a culture medium produces about 20 mg, 30 gm, 40 mg, 50 mg, 60 mg, 70 mg, 80 mg, 90 mg or 100 mg, of mycelia, respectively, or inoculation of about 1.5 g, 2 g, 2.5 g, 3 g, 3.5 g, 4 g, 4.5 g or 5 g of mycelia into a culture medium produces about 150 g, 200 g, 250 g, 300 g, 350 g, 400 g, 450 g, or 500 g of mycelia, respectively.

Incubating of ectomycorrhizal fungi may be carried out, for example, in a dish, a culture vessel or flask, or in a bioreactor. Any culture vessel, flask, or bioreactor suitable for growing fungal mycelia may be used with the methods of the invention. In some embodiments, the incubating may be carried out in a bioreactor. Any bioreactor suitable for growing ectomycorrhizal fungi may be used, including but not limited to, submerged liquid fermentation bioreactors, continuous stirred tank bioreactors, airlift bioreactors, photo-bioreactors and/or membrane bioreactors, and the like. The capacity (volume) of the bioreactor may vary from about 1 L to about 1000 L (e.g., 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, or 1000 L bioreactor).

Prior to use (e.g., prior to introducing culture media and prior to inoculating with the ectomycorrhizal mycelia and incubating the ectomycorrhizal mycelia), a bioreactor may be sterilized. Sterilization may be carried out using, for example, steam and/or ultraviolet germicidal irradiation (UVGI) (e.g., short-wavelength ultraviolet (UV-C) light). In some embodiments, UV-C may be used to sterilize the bioreactor. The parameters for UV-C may be, for example, about 40 watts for about 30 minutes. In some embodiments, steam may be used to sterilize a bioreactor (e.g., 120° C. for about 2 hours).

In some embodiments, the incubating may be carried out at a temperature of about 20° C. to about 35° C. (e.g., about 20, 21, 22, 23, 24, 25, 26, 27, 28, 29, 30, 31, 32, 33, 34 or 35° C., or any range or value therein). In some embodiments, the temperature for incubating can be in a range from about 20° C. to about 30° C. (e.g., about 20° C., 21° C., 22° C., 23° C. to about 24° C., 25° C., 26° C., 27° C., 28° C., 29° C., 30° C. or about 20° C., 21° C., 22° C., 23° C., 24° C., 25° C., 26° C. to about 27° C., 28° C., 29° C., 30° C., 31° C., 32° C., 33° C., 34° C., 35° C.). In some embodiments, the temperature for incubating can be in a range from about 22°

C. to about 28° C. (e.g., about 22° C., 23° C., 24° C. to about 25° C., 26° C., 27° C., 28° C.). In some embodiments, the temperature for incubating may be about 25° C.

In some embodiments, the culture medium may be at a pH of about 5 to about 8.5 (e.g., about 5, 5.5, 6, 6.5, 7, 7.5, 8, 8.5 or any value or range therein (e.g., about 5, 5.5, 6 to about 6.5, 7, 7.5, 8, 8.5)). In some embodiments, the pH of the culture medium used to cultivate the ectomycorrhizal mycelia is about 5.5 to about 8 (e.g., about pH 5, 5.5, 6, 6.5, 7, 7.5 or any value or range therein; e.g., about 5 to about 7, about 5 to about 6.5, about 5 to about 6). In some embodiments, the pH of the culture medium used for incubating may be about 5.5.

In some embodiments, the culture medium may be agitated during incubation of the ectomycorrhizal mycelia (e.g., the ectomycorrhizal MAT1-1 mycelia, ectomycorrhizal MAT1-2 mycelia, and ectomycorrhizal male mycelia). In some embodiments, the agitating may be performed at a speed in a range of about 50 rpm to about 500 rpm (e.g., about 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500 rpm, and any value or range therein). In some embodiments, the agitating may be performed at a speed in the range of about 50 rpm to 200 rpm, about 50 rpm to 300 rpm, about 50 rpm to 400 rpm, about 100 rpm to about 200 rpm, about 100 rpm to about 300 rpm, about 100 rpm to about 400 rpm, about 100 rpm to about 500, about 120 rpm to about 200 rpm, about 120 rpm to about 300 rpm, about 120 rpm to about 400 rpm, about 120 rpm to about 500 rpm, about 150 rpm to about 200 rpm, about 150 rpm to about 300 rpm, about 150 rpm to about 400 rpm, about 150 rpm to about 500 rpm, about 250 rpm to about 500 rpm, about 300 rpm to about 500 rpm, about 350 rpm to about 500 rpm, about 400 rpm to about 500 rpm or about 450 rpm to about 500 rpm. In some embodiments, agitating is at a speed of at about 150 rpm during incubation.

Any appropriate culture medium may be used for cultivating the ectomycorrhizal mycelia (e.g., the ectomycorrhizal MAT1-1 mycelia, ectomycorrhizal MAT1-2 mycelia, and ectomycorrhizal male mycelia). A culture medium useful for cultivating ectomycorrhizal mycelia typically comprises a carbon source and a nitrogen source. In some embodiments, the carbon source may be present in the culture medium at a concentration of about 1 g/L to about 100 g/L (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 g/L and any range or value therein; e.g., about 1 g/L to about 20 g/L, about 1 g/L to about 30 g/L, about 1 g/L to about 40 g/L, about 5 g/L to about 10 g/L, about 5 g/L to about 20 g/L, about 5 g/L to about 30 g/L, about 5 g/L to about 40 g/L, about 5 g/L to about 50 g/L, about 10 g/L to about 30 g/L, about 10 g/L to about 40 g/L, about 10 g/L to about 50 g/L, about 10 g/L to about 60 g/L, about 10 g/L to about 70 g/L, about 10 g/L to about 100 g/L, about 20 g/L to about 50 g/L, about 20 g/L to about 60 g/L, about 20 g/L to about 70 g/L, about 20 g/L to about 80 g/L, about 20 g/L to about 100 g/L, about 25 g/L to about 50 g/L, about 30 g/L to about 50 g/L, about 30 g/L to about 60 g/L, about 30 g/L to about 70 g/L, about 30 g/L to about 80 g/L, about 30 g/L to about 100 g/L, about 40 g/L to about 80 g/L, about 40 g/L to about 100 g/L, about 50 g/L to about 80 g/L, about 50 g/L to about 100 g/L, about 60 g/L to about 80 g/L, about 60 g/L to about 100 g/L, about 70 g/L to about 100 g/L, about 80 g/L to about 100 g/L, about 50 g/L to about 90 g/L, about 60 g/L to about 90 g/L, about 70 g/L to about 90 g/L, and the like). In some embodiments, the carbon source may be present in the culture medium at about 80 g/L. In some embodiments, the carbon source may be starch (e.g., soluble and/or insoluble starch), sucrose and/or glucose (i.e., D-glucose (dextrose), L-glucose). More than one carbon source may be used in a culture medium. When more than one carbon source is used, the more than one carbon source may be provided at a total concentration of about 1 g/L to about 100 g/L.

Starch is a polymeric carbohydrate consisting of covalent glycosidic bonded/interlinked glucose units. Starch useful with this invention can be obtained from any source, including, but not limited to, cereal crops (i.e. rice, wheat, corn), root vegetables (i.e. potatoes, cassava), seeds, roots and stems of any plants, or bio-engineered sources such as alga and yeast strains that are identified as producing starch or specifically designed to produce starch. Starch may be used in its insoluble form (e.g., amylum) or it may be made soluble and used in a culture medium in its soluble form. It is well known in the art how to make insoluble starch into soluble starch. In some embodiments, starch (soluble and/or insoluble) may be used in combination with other carbohydrate sources (e.g., glucose and/or sucrose). In some embodiments, starch (soluble and/or insoluble) may be the sole carbon source. In some embodiments, when starch is used as a carbon source in the fermentation process, contamination and competition from yeast is reduced. The ability to control yeast contamination in culture media is observed because, unlike individual glucose units, yeast cannot utilize starch as a carbohydrate source.

As an example, a culture media (including a pre-culture media, as described herein) may be prepared that includes starch as the carbon source. The culture medium comprising starch may be allowed to stand for one or more days (e.g., about 1-4 days), wherein any yeast that may be present die off due to lack of availability of nutrients for growth, thereby reducing or eliminating any yeast contamination. After standing for several days, mycelia of the ectomycorrhizal fungi may be added to the culture media that has reduced or no yeast contamination. Glucose may be added at this point without concern for competition by yeast. Notably, contamination and competition by yeast can also be reduced by using higher dissolved oxygen levels (e.g., about 60% dissolved oxygen). Dissolved oxygen levels that are disadvantageous to yeast growth (e.g., at least about 60% dissolved oxygen) may be used in combination with starch as the carbon source to reduce contamination and competition by yeast in a culture medium.

In some embodiments, the nitrogen source may be present in the culture medium at a concentration of about 1 g/L to about 10 g/L (e.g., about 1, 1.5, 2, 2.5, 3, 3.5, 4, 4.5, 5, 5.5, 6, 6.5, 7, 7.5, 8, 8.5, 9, 9.5, or 10 g/L and any range or value therein; e.g., about 1, 1.5, 2, 2.5, 3, 3.5, 4, 4.5, 5 g/L to about 6, 6.5, 7, 7.5, 8, 8.5, 9, 9.5, 10 g/L). In some embodiments, a nitrogen source may be present in the culture medium at a concentration of about 1 g/L to about 5 g/L (e.g., about 1, 1.5, 2, 2.5, 3, 3.5, 4, 4.5, or 5 g/L) optionally at about 4 g/L or about 5 g/L. In some embodiments, the nitrogen source may be peptone, tryptone, yeast extract, corn steep liquor, L-Glutamine, L-Arginine, Nitrate (NO3-), NaNO3, Nitrogen Gas (N2), Nitrogen-doped Carbon NanoParticles (N-CNP's) and/or NH3 (Ammonia). In some embodiments, the nitrogen source is peptone, tryptone, yeast extract, corn steep liquor, L-Glutamine, L-Arginine, Nitrate (NO3-), NaNO3, Nitrogen Gas (N2), and/or Nitrogen-doped Carbon NanoParticles (N-CNP's). In some embodiments, the nitrogen source is peptone, tryptone, yeast extract, corn steep liquor, L-Glutamine, L-Arginine, and/or Nitrate (NO3-). In some embodiments, the nitrogen source may be peptone, tryptone, yeast extract, and/or corn steep liquor. More than one nitrogen source may be used (e.g., any combination of peptone, tryptone, yeast extract, and/or corn steep liquor). When more than one carbon source is used, the more than one nitrogen sources is provided at a total concentration of about 1 g/L to about 10 g/L, or about 1 g/L to about 5 g/L, optionally at about 4 g/L or about 5 g/L.

In some embodiments, a culture medium for incubating the ectomycorrhizal mycelia may further comprise one or more vitamins, including, but not limited to, thiamine-HCl or biotin (i.e., Vitamin B7, Vitamin B8, Vitamin H). When used in a culture medium of the invention, the one or more vitamin(s) (e.g., thiamine and/or biotin) are present at a total concentration of about 0.05 g/L to about 0.5 g/L (e.g., 0.02, 0.03, 0.04, 0.05, 0.06, 0.07, 0.08, 0.09, 0.1, 0.2, 0.3, 0.4, 0.5 g/L and any range or value therein, e.g., 0.02, 0.03, 0.04, 0.05 0.06 to about 0.07, 0.08, 0.09, 0.1, 0.2, 0.3, 0.4, 0.5 g/L, (e.g., 0.02 g/L to about 0.1 g/L or about 0.02 g/L to about 0.08 g/L and the like)). In some embodiments, the one or more vitamin(s) is present in the culture medium at a concentration of about 0.05 g/L. In some embodiments, the one or more vitamin(s) is thiamine-HCL in the culture medium at a concentration of about 0.05 g/L. In some embodiments, the one or more vitamin(s) is biotin in the culture medium at a concentration of about 0.05 g/L. In some embodiments, the one or more vitamin(s) is thiamine-HCL and biotin in the culture medium at a total concentration of about 0.05 g/L.

In some embodiments, a culture medium for incubating the ectomycorrhizal mycelia may further comprise potassium and/or magnesium. In some embodiments, the potassium is provided as monopotassium phosphate ($KH_2PO_4$), potassium chloride (KCl), diammonium phosphate (($NH_4$)$_2HPO_4$) and/or potassium oxide ($K_2O$) at a concentration about 0.2 g/L to about 5 g/L (e.g., about 0.2, 0.3, 0.4, 0.5, 0.6, 0.7, 0.8, 0.9, 1, 1.5, 2, 2.5, 3, 3.5, 4, 4.5, 5 g/L and any range or value therein (e.g., a range from about 0.2, 0.3, 0.4, 0.5, 0.6, 0.7, 0.8, 0.9, 1, 1.5 g/L to about 2, 2.5, 3, 3.5, 4, 4.5, 5 g/L)); or about 1 mM to about 15 mM (e.g, about 1, 2, 3, 4, 5, 6, 7, 8, 9, 10, 11, 12, 13, 14, 15 mM, and any range or value therein). In some embodiments, the potassium may be provided as KCl. In some embodiments, the potassium may be provided in the medium at a concentration of 5 mm. In some embodiments, the magnesium may be provided as a hydrate compound of magnesium sulfate (e.g., $MgSO_4 \cdot nH_2O$, n=1-11; e.g., heptahydrate ($MgSO_4 \cdot 7H_2O$), hexahydrate ($MgSO_4 \cdot 6H_2O$), tetrahydrate ($MgSO_4 \cdot 4H_2O$), pentahydrate ($MgSO_4 \cdot 5H_2O$), trihydrate ($MgSO_4 \cdot 3H_2O$), and the like), magnesium chloride ($MgCl_2$) or magnesium oxide (MgO) at a concentration of about 0.5 g/L to about 5 g/L (e.g., about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5 g/L and any range or value therein, e.g., about 0.5, 0.6, 0.7, 0.8, 0.9, 1, 1.1 to about 1.2, 1.3, 1.4, 1.5, 1.6, 1.7, 1.8, 1.9, 2; or about 5 mM to about 60 mM (e.g., about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 mM and any range or value therein; e.g., a range from about 5, 6, 7, 8, 9, 10, 11, 12, 13, 14, 15, 16, 17, 18, 19, 20 mM to about 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 mM). In some embodiments, the magnesium is provided in the culture medium at a concentration of 30 mm. In some embodiments, the magnesium is provided as $MgCl_2$, optionally $MgSO_4 \cdot 7H_2O$.

In some embodiments, the dissolved oxygen level in the culture medium may be monitored, and/or the level may be maintained at and/or adjusted to be about 15% to about 60% (e.g., about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60% or any value or range therein; e.g., a range from about 15, 16, 17, 18, 19, 20, 21, 22, 23, 24, 25% to about 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60%). Optionally, the dissolved oxygen level may be monitored, maintained and/or adjusted to be from about 20% to about 40%, or at about 30%.

In some embodiments, prior to incubating the ectomycorrhizal mycelial biomass (comprising the ectomycorrhizal MAT1-1 mycelia, ectomycorrhizal MAT1-2 mycelia, and ectomycorrhizal male mycelia), the method of cultivating ectomycorrhizal fungi of the invention may include a step of pre-culturing the ectomycorrhizal MAT1-1 mycelia, ectomycorrhizal MAT1-2 mycelia, and ectomycorrhizal male mycelia in a pre-culture medium for about one day to about 30 days (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 days, and any range or value therein; e.g., about 3 days to about 10 days, about 3 days to about 15 days, about 3 days to about 20 days, about 5 days to about 10 days, about 5 days to about 15 days, about 5 days to about 20 days, about 7 days to about 30 days, about 9 days to about 15 days, about 9 days to about 20 days, about 9 days to about 25 days, about 9 days to about 30 days, about 10 days to about 15 days, about 10 days to about 15 days, about 10 days to about 20 days, about 10 days to about 30 days, about 12 days to about 20 days, about 12 days to about 30 days, about 15 days to about 20 days, or about 15 days to about 30 days), thereby producing a pre-cultured mycelial composition comprising ectomycorrhizal MAT1-1 mycelia, ectomycorrhizal MAT1-2 mycelia, and ectomycorrhizal male mycelia. The pre-cultured mycelial composition may be used directly for inoculating the culture medium in the incubating step for producing the ectomycorrhizal fungal biomass comprising MAT1-1 ectomycorrhizal mycelia, MAT1-2 ectomycorrhizal mycelia, and male ectomycorrhizal mycelia. Alternatively or in addition, prior to the step of inoculating the culture medium for cultivating ectomycorrhizal mycelia, at least a portion of the pre-cultured mycelial composition may be combined with a fresh culture medium to provide a first pre-cultured mycelial mixture. The first pre-cultured mycelial mixture may be cultured to provide a second pre-cultured mycelial mixture, wherein the first pre-cultured mycelial mixture and the second pre-cultured mycelial mixture comprise MAT1-1 ectomycorrhizal mycelia, MAT1-2 ectomycorrhizal mycelia, and male ectomycorrhizal mycelia.

In some embodiments, combining at least a portion of a pre-cultured mycelial composition and the fresh culture medium may comprise transferring at least a portion of pre-cultured mycelial composition to fresh culture medium and/or it may comprise adding fresh culture medium to at least a portion of the pre-cultured mycelial composition. In some embodiments, when fresh culture media is added to the pre-cultured mycelial composition, at least a portion (e.g., about 1% to about 99%, e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or any range or value therein) or all (100%) of the pre-culture medium of the mycelial composition may be removed (e.g., drained, filtered, and the like) from the mycelial composition prior to the adding of fresh culture medium.

In some embodiments, a portion (e.g., about 1% to about 99%, e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or any range or value therein) or all (100%) of a pre-cultured mycelial composition may be transferred to fresh culture medium. In some embodiments, the pre-culture medium of the mycelial composition may be removed (e.g., drained, filtered, and the like) from the mycelial composition and the mycelial composition transferred to fresh media. In some embodiments, a portion (e.g., about 1, 2, 3, 4, 5, 6, 7, 8, 9, 10, 11, 12, 13, 14, 15, 16, 17, 18, 19, of 20 ml to about 100, 150, 200, 250, 300, 350, 400, 450, 500 ml or more) of a culture medium comprising the mycelial composition or a pre-culture medium comprising the pre-cultured mycelial mixture may be used to inoculate fresh medium.

In some embodiments, the ectomycorrhizal MAT1-1 mycelia, ectomycorrhizal MAT1-2 mycelia, and ectomycorrhizal male mycelia may be stored for about 1 day to about 5 years prior to incubating to produce the ectomycorrhizal mycelial biomass and/or prior to pre-culturing to produce the mycelial composition (e.g., stored at a temperature of more than 0° C. to about 4° C. (i.e., not frozen) for about 1 day to about 28 days, optionally about a week; or stored at a temperature of about 0° C. to about −86° C. (i.e., frozen) or cryopreserved (e.g., about −130° C. to about −196° C.) for about 1 day to about 10 years or longer (e.g., indefinitely). In some embodiments, the ectomycorrhizal MAT1-1 mycelia, ectomycorrhizal MAT1-2 mycelia, and ectomycorrhizal male mycelia may be stored cold or frozen as described herein for less than a day, e.g., 1, 2, 3, 4, 5, 6, 7, 8, 9, 10, 11, 12, 13, 14, 15, 16, 17, 18, 19, 20, 21, 22, or 23 hours, and any and range or value therein.

The mycelial compositions and pre-cultured mycelial mixtures of the invention may provide an increased amount of mycelia for cultivating ectomycorrhizal fungi as described herein. Thus, in some embodiments, prior to incubating, a culture medium may be inoculated with at least a portion of a mycelial composition and/or a pre-cultured mycelial mixture. In some embodiments, a culture medium may be inoculated with mycorrhized roots as described herein in addition to or instead of inoculating at least a portion of a mycelial composition and/or a pre-cultured mycelial mixture. Inoculating a culture medium for cultivating ectomycorrhizal fungi with mycorrhized roots, and/or a mycelial composition and/or a pre-cultured mycelial mixture of the invention provides an increase in the ectomycorrhizal biomass that is produced as compared to incubating ectomycorrhizal MAT1-1 mycelia, ectomycorrhizal MAT1-2 mycelia, and ectomycorrhizal male mycelia that has not been pre-cultured as described herein.

In some embodiments, the pre-culturing step and/or the culturing of the first pre-cultured mycelial mixture may be carried out for about 1 day to about 30 days (e.g., about 1 day to about 5 days, about 1 day to about 7 days, about 1 day to about 10 days, about 1 day to about 15 days, about 1 day to about 20 days, about 1 day to about 25 days, about 2 days to about 5 days, about 2 days to about 10 days, about 2 days to about 15 days, about 2 days to about 20 days, about 2 days to about 30 days, about 5 days to about 10 days, about 5 days to about 15 days, about 5 days to about 20 days, about 5 days to about 25 days, about 7 days to about 15 days, about 7 days to about 20 days, about 7 days to about 30 days, about 9 days to about 15 days, about 9 days to about 20, about 9 days to about 25 days, about 9 days to about 30 days, about 10 days to about 15 days, about 10 days to about 20 days, about 10 days to about 30 days, about 12 days to about 20 days, about 12 days to about 25 days, about 15 days to about 20 days, about 15 days to about 30 days, or e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 days or any range or value therein). In some embodiments, the pre-culturing step and/or the culturing of the first pre-cultured mycelial mixture may be carried out for about 1 day to about 7 days, optionally for about 2 days or about 5 days.

In some embodiments, the pre-culturing step and/or the culturing of the first pre-cultured mycelial mixture may be carried out at a temperature of about 20° C. to about 35° C. (e.g., about 20, 21, 22, 23, 24, 25, 26, 27, 28, 29, 30, 31, 32, 33, 34 or 35° C., or any range or value therein). In some embodiments, the temperature for the pre-culturing step and/or the culturing of the first pre-cultured mycelial composition can be in a range from about 20° C. to about 30° C. (e.g., about 20° C., 21° C., 22° C., 23° C., 24° C., 25° C., 26° C. to about 27° C., 28° C., 29° C., 30° C., 31° C., 32° C., 33° C., 34° C., 35° C.). In some embodiments, the temperature for incubating can be in a range from about 22° C. to about 28° C. (e.g., about 22° C., 23° C., 24° C. to about 25° C., 26° C., 27° C., 28° C.). In some embodiments, the temperature for the pre-culturing step and/or the culturing of the first pre-cultured mycelial mixture is about 25° C.

In some embodiments, the pre-culturing step and/or the culturing of the first pre-cultured mycelial mixture may be carried out at a pH of about 5 to about 8.5 (e.g., about 5, 5.5, 6, 6.5, 7, 7.5, 8, 8.5 or any value or range therein). In some embodiments, the pH of the media for the pre-culturing step and/or the culturing of the first pre-cultured mycelial mixture may be about 5 to about 8 (e.g., about pH 5, 5.5, 6, 6.5, 7, 7.5, 8 or any value or range therein; e.g., about 5 to about 7.5, about 5 to about 7, about 5 to about 6.5, about 5 to about 6). In some embodiments, the pH of the culture media for the pre-culturing step and/or the culturing of the first pre-cultured mycelial mixture is about 5.5.

In some embodiments, the pre-culturing step and/or the culturing of the pre-cultured mycelial mixture comprises agitating the media. In some embodiments, the agitating may be at a speed in a range of about 10 rpm to about 500 rpm (e.g., about 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500 rpm, and any value or range therein). In some embodiments, the agitating may be at a speed in a range from about 10 rpm to 200 rpm, about 10 rpm to 300 rpm, about 10 rpm to 400 rpm, about 25 rpm to 400 rpm, about 25 rpm to 200 rpm, about 25 rpm to 300 rpm, about 25 rpm to 400 rpm, about 25 rpm to 500 rpm, about 50 rpm to 200 rpm, about 50 rpm to 300 rpm, about 50 rpm to 400 rpm, about 50 rpm to 500 rpm, about 100 rpm to about 175 rpm, about 100 rpm to about 200 rpm, about 100 rpm to about 300 rpm, about 100 rpm to about 400 rpm, about 100 rpm to about 500 rpm, about 120 rpm to about 200 rpm, about 120 rpm to about 150 rpm, or about 120 rpm to about 175 rpm. In some embodiments, the culture medium for the pre-culturing step and/or the culturing of the first pre-cultured mycelial mixture may be agitated at a speed of from about 100 rpm to about 200 rpm, optionally at about 120 rpm or about 150 rpm.

Any appropriate medium may be used for the pre-culturing step (pre-culture medium) and/or the culturing of the first pre-cultured mycelial mixture (fresh culture medium). Media for pre-culturing (pre-culture medium) and culturing of the first pre-cultured mycelial mixture (fresh culture medium) typically comprises a carbon source and a nitrogen source. In some embodiments, the carbon source may be present in the culture medium at a concentration of about 1 g/L to about 80 g/L (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80 g/L and any range or value therein; e.g., about 1 g/L to about 20 g/L, about 1 g/L to about 30 g/L, about 1 g/L to about 40 g/L, about 5 g/L to about 10 g/L, about 5 g/L to about 20 g/L, about 5 g/L to about 30 g/L, about 5 g/L to about 40 g/L, about 5 g/L to about 50 g/L, about 10 g/L to about 30 g/L, about 10 g/L to about 40 g/L, about 10 g/L to about 50 g/L, about 10 g/L to about 60 g/L, about 10 g/L to about 70 g/L, about 20 g/L to about 50 g/L, about 20 g/L to about 60 g/L, about 20 g/L to about 70 g/L, about 20 g/L to about 80 g/L, about 25 g/L to about 50 g/L, about 30 g/L to about 50 g/L, about 30 g/L to about 60 g/L, about 30 g/L to about 70 g/L, about 30 g/L to about 80 g/L, about 40 g/L to about 80 g/L, about 50 g/L to about 80 g/L, about 60 g/L to about 80 g/L, and the like). In some embodiments, the carbon source is present in the pre-culture medium (for pre-culturing the mycelial composition) or the fresh medium (for culturing the first pre-cultured mycelial mixture) at about 35 g/L. In some embodiments, the carbon source may be starch (soluble/insoluble), sucrose and/or glucose, alone or in any combination, as described herein.

In some embodiments, the nitrogen source may be present in the medium for pre-culturing and/or for culturing of the first pre-cultured mycelial mixture at a concentration of about 1 g/L to about 10 g/L (e.g., about 1, 1.5, 2, 2.5, 3, 3.5, 4, 4.5, 5, 5.5, 6, 6.5, 7, 7.5, 8, 8.5, 9, 9.5, 10 g/L and any range or value therein; e.g., about 1, 1.5, 2, 2.5, 3, 3.5, 4, 4.5, 5 g/L to about 6, 6.5, 7, 7.5, 8, 8.5, 9, 9.5, 10 g/L). In some embodiments, the nitrogen source is present in the medium for pre-culturing and/or for culturing of the first pre-cultured mycelial mixture at a concentration of about 1 g/L to about 5 g/L (e.g., about 1, 1.5, 2, 2.5, 3, 3.5, 4, 4.5, or 5 g/L). In some embodiments, the nitrogen source may be peptone, tryptone, yeast extract and/or corn steep liquor (e.g., any combination of peptone, tryptone, yeast extract, and/or corn steep liquor). More than one nitrogen source may be used and when more than one nitrogen source is used, the more than one nitrogen source may be provided at a total concentration of about 1 g/L to about 10 g/L, about 1 g/L to about 5 g/L, about 1 g/L to about 4 g/L (e.g., about 1, 1.5, 2, 2.5, 3, 3.5, 4 g/L, and any range or value therein), optionally at about 4 g/L or about 5 g/L. In some embodiments, the nitrogen source may be present in the medium for pre-culturing and/or for culturing of the first pre-cultured mycelial mixture at a concentration of about 2.5 g/L.

In some embodiments, the medium for pre-culturing and/or for culturing of the first pre-cultured mycelial mixture may further comprise a vitamin (e.g., thiamine-HCl and/or biotin or a combination thereof) at a concentration of about 0.02 g/L to about 0.5 g/L (e.g., 0.02, 0.03, 0.04, 0.05, 0.06, 0.07, 0.08, 0.09, 0.1, 0.2, 0.3, 0.4, 0.5 g/L; e.g., 0.02, 0.03, 0.04, 0.05, 0.06 g/L to about 0.07, 0.08, 0.09, 0.1, 0.2, 0.3, 0.4, 0.5 g/L and any range or value therein (e.g., 0.02 g/L to about 0.1 g/L or about 0.02 g/L to about 0.08 g/L and the like)). In some embodiments, thiamine-HCl and/or biotin may be present at a total concentration of about 0.05 g/L in the pre-culture medium and/or in the medium for culturing of the first pre-cultured mycelial mixture.

In some embodiments, medium for pre-culturing and/or for culturing of the first pre-cultured mycelial mixture may further comprise potassium and/or magnesium. In some embodiments, the potassium may be provided as monopotassium phosphate ($KH_2PO_4$), potassium chloride (KCl) and/or potassium oxide ($K_2O$) at a concentration about 0.2 g/L to about 5 g/L (e.g., about 0.2, 0.3, 0.4, 0.5, 0.6, 0.7, 0.8, 0.9, 1, 1.5, 2, 2.5, 3, 3.5, 4, 4.5, 5 g/L and any range or value therein, e.g., about 0.2, 0.3, 0.4, 0.5, 0.6, 0.7, 0.8, 0.9 g/L to about 1, 1.5, 2, 2.5, 3, 3.5, 4, 4.5, 5 g/L); or about 1 mM to about 15 mM (e.g, 1, 2, 3, 4, 5, 6, 7, 8, 9, 10, 11, 12, 13, 14, 15 mM, and any range or value therein). In some embodiments, the potassium may be provided as $KH_2PO_4$.

In some embodiments, the potassium may be provided in the medium at a concentration of 2.5 g/L. In some embodiments, the magnesium is provided as magnesium sulfate heptahydrate ($MgSO_4$), magnesium chloride ($MgCl_2$) or magnesium oxide (MgO) at a concentration of about 0.5 g/L to about 5 g/L (e.g., about 0.5, 0.6, 0.7, 0.8, 0.9, 1, 1.1, 1.2, 1.3, 1.4, 1.5 g/L to about 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5 g/L and any range or value therein); or about 5 mM to about 60 mM (e.g., about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 mM and any range or value therein; e.g., a range of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35 mM to about 36, 37, 38, 39, 40, 41, 42, 43, 44, 45, 46, 47, 48, 49, 50, 51, 52, 53, 54, 55, 56, 57, 58, 59, 60 mM). In some embodiments, the magnesium is provided as $MgSO_4$. In some embodiments, the magnesium is provided in the medium for pre-culturing and/or for culturing of the first pre-cultured mycelial mixture at a concentration of about 0.5 g/L to about 2 g/L, optionally about 1 g/L.

In some embodiments, the medium for pre-culturing (pre-culture medium) and/or for culturing of the first pre-cultured mycelial mixture (fresh culture medium) may be the same or they may be different. In some embodiments, the culture conditions (e.g., temperature, pH and agitation speed) for pre-culturing and/or for culturing of the first pre-cultured mycelial mixture may be the same or may be different.

In an exemplary embodiment, a medium for pre-culturing (pre-culture medium) and/or for culturing of the pre-cultured mycelial mixture (fresh culture medium) may comprise 35 g/L of glucose, 5 g/L of peptone, 2.5 g/L of yeast extract, 2.5 g/L of KPO4, 1 g/L of MgSO4, 0.05 g/L of thiamine-HCL, at pH 5.5, and the culturing of the pre-cultured mycelial composition may be at a temperature of 25° C. for about 5 days with agitation at a speed of about 150 rpm. In some embodiments, the culturing of the first pre-cultured mycelial mixture may be at a temperature of 25° C. for about 2 days at an agitation speed of about 150 rpm.

In some embodiments, during the incubating of ectomycorrhizal MAT1-1 mycelia, ectomycorrhizal MAT1-2 mycelia, and ectomycorrhizal male mycelia, the incubating of a mycelial composition, and/or the incubating of a first pre-cultured mycelial mixture at least one nutrient may be added to the culture medium (e.g., pulse feeding, batch feeding). The at least one nutrient may be a nitrogen source and/or a carbon source.

In some embodiments, when a nitrogen source is added as a nutrient (e.g., pulse fed, batch fed, e.g., a fed-batch culture) to the culture medium during incubating, the nitrogen source may be added to achieve a concentration of about 1 g/L to about 5 g/L, optionally a concentration of about 1 g/L to about 10 g/L (e.g., about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5 g/L and any range or value therein; e.g., about 1 g/L to about 2 g/L, about 1 g/L to about 3 g/L, about 1 g/L to about 4 g/L, and the like). In some embodiments, a nitrogen source is pulse fed to the incubating mycelia at an amount to achieve a concentration of about 1 g/L to about 2.5 g/L, optionally a concentration of about 1.5, 1.7 or 2 g/L. In some embodiments, the nitrogen source may be peptone, tryptone, yeast extract, and/or corn steep liquor, which may be used in any combination as one or more nitrogen sources.

In some embodiments, when a carbon source is added as a nutrient to the culture medium during incubating, the carbon source may be added to achieve a concentration of about 1 g/L to about 50 g/L, optionally a concentration of about 1 g/L to about 10 g/L (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 g/L and any range or value therein; e.g., about 1 g/L to about 10 g/L, about 1 g/L to about 20 g/L, about 1 g/L to about 30 g/L, about 1 g/L to about 40 g/L, about 5 g/L to about 10 g/L, about 5 g/L to about 20 g/L, about 5 g/L to about 30 g/L, about 5 g/L to about 40 g/L, about 5 g/L to about 50 g/L, about 10 g/L to about 30 g/L, about 10 g/L to about 40 g/L, about 10 g/L to about 50 g/L, about 20 g/L to about 30 g/L, about 20 g/L to about 40 g/L, about 20 g/L to about 50 g/L, about 25 g/L to about 30 g/L, about 30 g/L to about 40 g/L, about 30 g/L to about 50 g/L, about 40 g/L to about 50 g/L, and the like). In some embodiments, the carbon source may be sucrose, glucose and/or starch, which may be used in any combination as one or more carbon sources.

In some embodiments, during the incubating of ectomycorrhizal MAT1-1 mycelia, ectomycorrhizal MAT1-2 mycelia, and ectomycorrhizal male mycelia, the incubating of a mycelial composition, and/or the incubating of a pre-cultured mycelial mixture of the invention, the culture may be may be pulse fed with peptone and/or yeast extract to achieve a concentration of about 1.7 g/L and 8 g/L, respectively.

Pulse feeding or batch feeding may be done in any useful interval or combination of intervals during incubating. In some embodiments, the at least one nutrient may be added/pulse fed, every day, every 2 days or every 3 days, or any combination thereof (or every 4 days, or every 5 days, or every week, or any combination thereof, until the end of incubation). In some embodiments, the at least one nutrient may be added every 3 days until day 9 (e.g., day 3, day 6, and day 9 after initiating the incubating). Alternatively, in some embodiments, the at least one nutrient may be added every 3 days until day 12, day 15, day 18, day 27, day 36, day 45 or day 48 and the like (e.g., until the end of incubation). In some embodiments, the at least one nutrient may be added every 3 days until day 10 (e.g., day 2, day 4, day 6, day 8, or day 10 after initiating the incubating). Alternatively, in some embodiments, the at least one nutrient may be added every 2 days until day 12, day 14, day 16, day 18, day 20, day 22 and the like, until the end of incubation. In some embodiments, the at least one nutrient may be added in some combination of every 2 or every 3 days, e.g., at day 2, day 4, day 7, day 10, day 12, day 15 and the like, until the end of incubation.

The methods of the present invention provide substantial amounts of ectomycorrhizal mycelia for use in, for example, inoculating of seeds, seedlings, trees, substrates for planting seeds and/or seedlings and/or substrates in which trees are growing. In some embodiments, the ectomycorrhizal mycelial biomass is produced in an amount from about 1 g/L to about 150 g/L of culture fluid (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150 g/L or any range or value therein; e.g., a range from about 5 g/L to about 50 g/L, about 10 g/L to about 50 g/L, about 10 g/L to about 60 g/L, about 10 g/L to about 70 g/L, about 10 g/L to about 80 g/L, about 10 g/L to about 100 g/L, about 10 g/L to about 120 g/L, about 10 g/L to about 150 g/L, about 20 g/L to about 50 g/L, about 20 g/L to about 70 g/L, about 20 g/L to about 100 g/L, about 20 g/L to about 150 g/L, about 40 g/L to about 100 g/L, about 40 g/L to about 150 g/L, about 50 g/L to about 100 g/L, about 50 g/L to about 150 g/L, about 60 g/L to about 100 g/L, about 60 g/L to about 150 g/L, about 75 g/L to about 100 g/L, about 75 g/L to about 120 g/L, about 75 g/L to about 150 g/L, about 90 g/L to about 150 g/L, or about 100 g/L to about 150 g/L).

In some embodiments, the methods of the present invention may provide a 10 to a 100 fold increase or more in ectomycorrhizal mycelia produced (output) over the amount of ectomycorrhizal mycelia that is inoculated (input) (e.g., 10, 15, 20, 25, 30, 35, 40, 45, 50, 55, 60, 65, 70, 75, 80, 85, 90, 95, or 100 fold increase or more). In some embodiments, the ratio of the amount of mycelia produced by methods of the invention to the amount of mycelia that is inputted into a bioreactor is about 25:1 to about 100:1, or more (e.g., about 25:1, 30:1, 35:1, 40:1, 45:1, 50:1, 55:1, 60:1, 65:1, 70:1, 75:1, 80:1, 85:1, 90:1, 95:1, 100:1, 110:1, 120: 130:1. 140:1 or 150:1 or more).

In some embodiments, the cultivated ectomycorrhizal mycelia or the ectomycorrhizal mycelial biomass of the invention may be separated from the culture medium. The separating of the cultivated ectomycorrhizal mycelia/ectomycorrhizal mycelial biomass from a culture medium may be accomplished using any method or combination of methods known in the art for separating fungal mycelia from a liquid. In some embodiments, separating the ectomycorrhizal mycelial biomass from the culture medium may comprise filtering the ectomycorrhizal mycelial biomass through a filtration device (e.g., a sieve). In some embodiments, the filtration device may have a particle opening size of about 10 microns to about 100 microns (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 microns; e.g., about 10 to about 30, about 10 to about 40, about 10 to about 50, about 10 to about 60, about 10 to about 70, about 10 to about 80, about 10 to about 90, about 20 to about 30, about 20 to about 40, about 20 to about 50, about 20 to about 60, about 20 to about 70, about 20 to about 80, about 20 to about 90, about 20 to about 100, about 25 to about 40, about 25 to about 50, about 25 to about 60, about 25 to about 70, about 25 to about 80, about 25 to about 90, about 25 to about 100, about 30 to about 40, about 30 to about 50, about 30 to about 60, about 30 to about 70, about 30 to about 80, about 30 to about 90, about 30 to about 100, about 50 to about 60, about 50 to about 70, about 50 to about 80, about 50 to about 90, about 50 to about 100 microns, or any range or value therein). In some embodiments, the filtration device may have a particle opening size of about 20 microns to about 50 microns, or about 30 microns. In some embodiments, more than one filtration device may be used each of which may have the same or different particle opening size as described herein.

The ectomycorrhizal mycelial biomass that is separated from the culture media may be washed. In some embodiments, the washing may be carried out using water (e.g., tap water, bottled water, spring water, distilled water, double distilled water, and/or deionized water). In some embodiments, the water may be sterile.

In some embodiments, the liquid culture that has been separated from the mycelium may be extracted to obtain metabolites excreted by the ectomycorrhizal mycelia during incubation.

In some embodiments, the ectomycorrhizal mycelial biomass that is separated from culture media may be stored at a cold temperature (i.e., not freezing; e.g., greater than 0° C. to about 4° C.). In some embodiments, the ectomycorrhizal mycelial biomass that is separated from culture media may be frozen to provide a frozen ectomycorrhizal mycelial biomass. In some embodiments, the freezing may be carried out at a temperature of about −10° C. to about −0° C. or at a temperature of about −86° C. to about −40° C. In some embodiments, the ectomycorrhizal mycelial biomass may be cryopreserved in liquid nitrogen (e.g., at a temperature of about −130° C. to about −196° C.) (see, e.g., Piattoni et al. Cryo Letters 38(1):58-64 (2017)) to produce a cryopreserved ectomycorrhizal mycelial biomass. In some embodiments, the frozen ectomycorrhizal mycelial biomass may be stored under freezing conditions (e.g., at about 0° C. to about −86° C.) for about one day to about 10 years or longer (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days, or 5 weeks, 6 weeks, 7 weeks, or 8 weeks, or 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 months, or 6, 7, 8, 9, 10, 11, 12, 13, 14, 15 years or longer, and any range or value therein). In some embodiments, an ectomycorrhizal mycelial biomass may be stored at about −10° C. to about 0° C. for about 1 day to about 28 days (e.g., about 1, 2, 3, 4, 5, 6, 7, 8, 9, 10, 11, 12, 13, 14, 15, 16, 17, 18, 19, 20, 21, 22, 23, 24, 25, 26, 27, or 28 days or more; e.g., about 1, 2, 3, 4, 5, 6, 7, 8, 9, 10, 11, 12, 13 days to about 14, 15, 16, 17, 18, 19, 20, 21, 22, 23, 24, 25, 26, 27, or 28 days). In some embodiments, the cryopreserved ectomycorrhizal mycelial biomass may be stored at about −130° C. to about −196° C. for about one day to about 10 years or longer (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 days, or 5 weeks, 6 weeks, 7 weeks, 8 weeks, or 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 months, or 6, 7, 8, 9, 10, 11, 12, 13, 14, 15 years or longer, and any range or value therein).

The present invention further provides methods for preparing ectomycorrhizal MAT1-1 mycelia, ectomycorrhizal MAT1-2 mycelia, and ectomycorrhizal male mycelia, for example, for incubating to produce an ectomycorrhizal mycelial biomass. Thus, in some embodiments, prior to incubating, ectomycorrhizal MAT1-1 mycelia and/or ectomycorrhizal MAT1-2 mycelia may be (a) isolated from (i) plant root tips infected with an ectomycorrhizal fungus or (ii) an ectomycorrhizal fungal fruiting body; and/or are (b) obtained from spores isolated from a mature ectomycorrhizal fungal fruiting body (and subsequently germinated). In some embodiments, prior to incubating, ectomycorrhizal male mycelia may be obtained from spores isolated from a mature ectomycorrhizal fungal fruiting body (and subsequently germinated).

In some embodiments, isolating ectomycorrhizal MAT1-1 mycelia and/or ectomycorrhizal MAT1-2 mycelia from host plant/tree root tips infected with an ectomycorrhizal fungus may comprise: (i) removing debris from the host plant root tips (roots collected and identified as infected with the correct ectomycorrhizal genus/species) (e.g., washing, e.g., an ultrasonic bath); (ii) immersing the root tips from (i) in a wetting agent (e.g., detergent, non-ionic surfactant, e.g., polysorbate 80 (e.g., Tween® 80)); hydrophilic polyethylene oxide (e.g., Triton® X detergent (e.g., Triton® X-100)); (iii) remove the wetting agent from the root tips from (ii) (e.g., rinsing with for example water, e.g., tap water, bottled water, spring water, distilled water, double distilled water, and/or deionized water). In some embodiments, the water is sterile; (iv) sterilizing the root tips from (iii) (e.g., immersing in a sterilizing solution (e.g., sodium hypochlorite, hydrogen peroxide)) to produce sterile root tips; (v) excising ectomycorrhizae from the sterile root tips to produce excised ectomycorrhizae; and (vi) culturing the excised ectomycorrhizae on a solid culturing medium (e.g., agar, e.g., potato dextrose agar, modified woody plant medium, Melin-Norkrans Modified Medium) to produce ectomycorrhizal mycelia that is maternal/female and MAT1-1 and/or ectomycorrhizal mycelia that is maternal/female and MAT1-2.

In some embodiments, isolating ectomycorrhizal MAT1-1 mycelia and/or ectomycorrhizal MAT1-2 mycelia from an ectomycorrhizal fungal fruiting body comprises: (i) surface sterilizing the ectomycorrhizal fungal fruiting body (e.g., submerging/dipping the fruiting body into sodium hypochlorite and/or hydrogen peroxide) to produce a sterile ectomycorrhizal fungal fruiting body; (ii) excising gleba from the sterile ectomycorrhizal fungal fruiting body under sterile conditions. Gleba is the white, sterile, heterothallic tissue of the fruiting body. The gleba is excised from the sterile ectomycorrhizal fungal fruiting body in about 1 mm to about 5 mm pieces (e.g., about 1, 1.5, 2, 2.5, 3, 3.5, 4, 4.5, 5 mm); and (iii) culturing the gleba from (ii) on a solid culturing medium (e.g., agar, e.g., potato dextrose agar, modified woody plant medium, Melin-Norkrans Modified Medium) to produce ectomycorrhizal mycelia that is maternal/female and MAT1-1 and/or ectomycorrhizal mycelia that is maternal/female and MAT1-2.

Ectomycorrhizal MAT1-1 mycelia, ectomycorrhizal MAT1-2 mycelia, and ectomycorrhizal male mycelia may also be obtained by isolating spores from a mature ectomycorrhizal fungal fruiting body and then germinating the spores to produce mycelia, which may be isolated and identified as MAT1-1 mycelia, MAT1-2 mycelia, or Male mycelia. Thus, in some embodiments, a method for obtaining ectomycorrhizal MAT1-1 mycelia, ectomycorrhizal MAT1-2 mycelia, and ectomycorrhizal male mycelia is provided, comprising: (i) excising pieces (about 1 mm to 5 mm, e.g., about 1, 2, 3, 4, 5 mm) of a mature ectomycorrhizal fungal fruiting body comprising asci and spores, optionally wherein the presence of asci and spores may be assessed, for example, via microscopic evaluation: e.g., observation of dark spores, high quality and high number, and no empty asci; (ii) surface sterilizing the excised pieces of the mature ectomycorrhizal fungal fruiting body from (i), optionally by, for example, immersion in alcohol (e.g., ethanol, isopropanol), which may be burnt off (e.g., for about 5 sec to about 30 sec depending on the thickness of the truffle peridium); (iii) lyophilizing the pieces of the mature ectomycorrhizal fungal fruiting body from (ii); and (iv) crushing the pieces of the mature ectomycorrhizal fungal fruiting body from (iii) to produce a powder comprising asci and spores. In some embodiments, the particle size of the powder may be about 0.5 mm to 0.75 mm. The spores may then be germinated to produce an ectomycorrhizal mycelia that is female and MAT1-1, an ectomycorrhizal mycelia that is female and MAT1-2, and/or an ectomycorrhizal mycelia that is male; (v) sterilizing the powder comprising asci and spores from (iv) (e.g., sodium hypochlorite, hydrogen peroxide) to produce a sterilized powder comprising asci and spores; and (vi) germinating the spores by: (a) contacting the sterilized powder comprising the asci and spores with oak root exudate concentrate on a solid culturing medium (e.g., agar, e.g., potato dextrose agar, modified woody plant medium, Melin-Norkrans Modified Medium), thereby germinating the spores to produce ectomycorrhizal mycelia that are female and MAT1-1, ectomycorrhizal mycelia that are female and MAT1-2, and/or an ectomycorrhizal mycelia that are male; and/or (b) adding water to the sterilized powder comprising asci and spores to produce a suspension comprising asci and spores; adding helicase and/or β-glucuronidase (e.g., from, for example, *Helix pomatia*) to the suspension comprising asci and spores to produce a suspension comprising digested asci and released spores; rinsing the suspension comprising digested asci and released spores one or more times (e.g., 1, 2, 3, 4, 5, 6, 7, 8, 9 or 10 or more times) with a sterilizing solution (e.g., sodium hypochlorite, chloramphenicol, and/or streptomycin) to produce a suspension comprising sterilized spores; isolating the sterilized spores (e.g., filtering with a sieve having a particle size opening of about 10-100 μM; e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 μM, or any combination thereof (e.g., more than one sieve having the same or different particle size openings may be used in combination); and culturing the sterilized spores on a solid culturing medium (e.g., agar, e.g., potato dextrose agar, modified woody plant medium, Melin-Norkrans Modified Medium), thereby germinating the sterilized spores to produce ectomycorrhizal mycelia that are female and MAT1-1, ectomycorrhizal mycelia that are female and MAT1-2, and/or an ectomycorrhizal mycelia that are male.

A sterilizing solution may be any sterilizing solution useful with fungal mycelia. In some embodiments, a sterilizing solution may comprise sodium hypochlorite, streptomycin and/or chloramphenicol, in any combination. In some embodiments, sodium hypochlorite may be present in a sterilizing solution in an amount of about 0.5% to about 8% (0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or 8%). In some embodiments, streptomycin and chloramphenicol may be present in a sterilizing solution in an amount of about 10 to about 100 mg/L (e.g., about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 g/L). In some embodiments, streptomycin and chloramphenicol may be present in a sterilizing solution in an amount of about 20 mg/L to about 50 mg/L, about 30 mg/L to about 40 mg/L, optionally about 35 mg/L.

In some embodiments, instead of or in addition to isolating the ectomycorrhizal mycelia, mycorrhized roots (e.g., roots infected with the ectomycorrhizal mycelia, e.g., ectomycorrhizal MAT1-1 mycelia, ectomycorrhizal MAT1-2 mycelia, and ectomycorrhizal male mycelia) may be used for inoculating/incubating to produce an ectomycorrhizal mycelial biomass.

Any method known in the art or later identified may be used to distinguish mating type and sex of ectomycorrhizal mycelia produced using the methods of this invention. Identifying the mating type and sex of the ectomycorrhizal mycelia is generally carried out prior to incubating or pre-culturing steps of the invention so that the appropriate mixture of ectomycorrhizal mycelia types are included in the incubating and pre-culturing, e.g., at least ectomycorrhizal MAT1-1 mycelia, ectomycorrhizal MAT1-2 mycelia and ectomycorrhizal male mycelia are inoculated into the culture media for incubating and/or for pre-culturing. The inclusion of each of these types of mycelia provides genetic diversity and versatility to the ectomycorrhizal mycelial biomass that is produced as it can be used for not only newly mycorrhizing seedling but also can be used to reinvigorate, re-mycorrhize previously mycorrhized/colonized trees, for example, in established truffle orchards to improve truffle production.

In order for trees to produce truffles (e.g., the fruiting body (spore-bearing body) of the fungus; e.g., the hypogeous, reproductive growth of the fungus), both MAT1-1 and MAT1-2 mating types (maternal) and male mycelia need to be present. Male mycelia produce conidia (e.g., conidiospores; mitospores), which when in contact with maternal mycelia form dikaryotic mycelia. The dikaryotic mycelia produces the truffles. Over time, truffle orchards may see a shift in mating type persistence, which can result in the disappearance of male mycelia altogether. Various areas of an orchard may segregate to different mating types, which means that in one area the mating type may become predominantly MAT1-1 or alternatively predominantly MAT1-2. In such an orchard, truffles would be produced on in overlapping root zones of these segregated areas in the orchard. By adding mycelia of both MAT types and corresponding male ectomycorrhizae mycelia, orchards can be reinvigorated and produce truffles again, or for the first time if there was initial segregation/loss of mycelial types when seedlings were planted.

Thus, in some embodiments, prior to incubating or pre-culturing, ectomycorrhizal MAT1-1 mycelia, ectomycorrhizal MAT1-2 mycelia and ectomycorrhizal male mycelium are identified and selected to produce an ectomycorrhizal MAT1-1 mycelium, ectomycorrhizal MAT1-2 mycelium and ectomycorrhizal male mycelium for incubating and pre-culturing. In some embodiments, genetic analysis may be used to determine the sex and matting type, wherein the genetic analysis may comprise identifying the presence of a genetic marker in the ectomycorrhizal mycelium. A genetic marker may be identified by any method known in the art or later identified, including, for example, polymerase chain reaction assay (PCR, e.g., multiplex PCR). In addition, markers may be used to identify particular ectomycorrhizal genera and species of interest.

In some embodiments, the genus *Tuber* may be identified using ITS (internal transcribed spacer) Band PCR at the β-tubulin gene site. Genera specific primers including, but not limited to, tubtubf (taggcaaacgatcagtggag) (SEQ ID NO:1) and elytubr (aaagacgaagitatetggectga) (SEQ ID NO:2) (Zampieri et al. FEMS Microbiol Lett 297(1):67-72 (2009)); fungal β-tubulin primers Bt2a (ggtaac-caaatcggtgctgctttc) (SEQ ID NO:3) and Bt2b (accetca-gigtagtgaecettgge) (SEQ ID NO:4) (Id.); or primer ITS4LNG (5'-tgatatgcttaagttcagcggg-3') (SEQ ID NO:5) (Palocci et al. FEMS Microbiol. Ecol. 28(1):23-30 (1999)) may be used to identify mycelia of the genus *Tuber*.

In some embodiments, the mating type may be identified using SSR PCR. Primers useful for identifying mating type MAT1-1 include, but are not limited to, primers P_19 (CAATCTCACTCGTGATGTCTGGGTC) (SEQ ID NO:6) and P_20 (TCTCGGGCTGGAGGTGCGGGTCGAGt) (SEQ ID NO:7) (Rubini et al. *New Phytol.* 189(3) 710-722 (2011); Linde and Selmes, *Applied Environ. Microbiol.* 78(18):6534-6539 (2012)) and SSR loci including, but not limited to, ME2 (GCCTTGGGTTTTAGCATCT-CAACTGG/CGATTGATGATCGGCTCCTTGATTTCTC) (SEQ ID NO:8/SEQ ID NO:9), ME4 (AGAAAGGAGGTG-GAGGAGAGAATGA/CGATTGATGATCGGCTCCTT-GATTTCTC) (SEQ ID NO:10/SEQ ID NO:9), H1b, F12I, 07ISSR9 (ATGATGCCTTTGTGCTTTCCTC/CGTT-CATCCCCAATGTAAGAGT) (SEQ ID NO:11/SEQ ID NO:12), and 07ISSR14 (TCCCAAGCAGTTGAT-GAGTTTCCCTTC/GGACTGTCTGCTTCTCAAT-TCCGCCG) (SEQ NO:13/SEQ ID NO:14), (Riccione et al. *New Phytol.* 180:466-478 (2008)). Markers useful for identifying mating type MAT1-2 include, but are not limited to, primers P_1 (CAGGTCCGTCATCTCCTTCCAGCAG) (SEQ ID NO:15) and P_2 (CCA-CATGCGACCGAGAATCTTGGCTA) (SEQ ID NO:16) (Rubini et al. *New Phytol.* 189(3) 710-722 (2011); Linde and Selmes, *Applied Environ. Microbiol.* 78(18):6534-6539 (2012)) and SSR loci including, but not limited to, ME2, ME4, H1b, F12I, 07ISSR9, and 07ISSR14.

The present invention further provides ectomycorrhizal MAT1-1 mycelia, ectomycorrhizal MAT1-2 mycelia, ectomycorrhizal male mycelia, and ectomycorrhizal mycelia biomass comprising ectomycorrhizal MAT1-1 mycelia, ectomycorrhizal MAT1-2 mycelia and ectomycorrhizal male mycelia produced by the methods of the invention.

The ectomycorrhizal MAT1-1-1 mycelia, ectomycorrhizal MAT1-2 mycelia, ectomycorrhizal male mycelia, and ectomycorrhizal mycelia biomass comprising ectomycorrhizal MAT1-1-1 mycelia, ectomycorrhizal MAT1-2 mycelia and ectomycorrhizal male mycelia may be used for inoculating seeds, seedlings, plants/trees, and substrates for planting and/or growing seeds, seedlings, plants and trees. Thus, in some embodiments, the present invention provides a method of producing a substrate for planting a seed or a seedling, the method comprising inoculating the substrate with a liquid suspension comprising the ectomycorrhizal mycelial biomass of the invention, or a portion thereof, thereby producing a substrate for planting a seed or seedling. In some embodiments, the substrate may be incubated with the liquid suspension, thereby colonizing the substrate with ectomycorrhizal mycelia. The substrate for planting a seed and/or seedling may be inoculated with the liquid suspension prior to, concurrently with, or after planting a seed or seedling in the substrate.

In some embodiments, the present invention further provides a method of colonizing the roots of a seedling with ectomycorrhizal mycelia, the method comprising: inoculating a seed with a liquid suspension comprising the ectomycorrhizal mycelial biomass of the present invention, and germinating the seed to produce a seedling, thereby colonizing the roots of the seedling. As the roots of the seedling emerge from the seed, they come into contact with the ectomycorrhizal mycelia from the liquid suspension and are colonized by the same. In some embodiments, a method of colonizing roots of a seedling with ectomycorrhizal mycelia is provided, the method comprising inoculating a seedling with a liquid suspension comprising the ectomycorrhizal mycelial biomass of the present invention, or a portion thereof, thereby colonizing the roots of the seedling. In some embodiments, the present invention further provides a method of colonizing roots of a seedling with ectomycorrhizal mycelia, the method comprising: inoculating a substrate for planting a seed and/or seedling with a liquid suspension comprising the ectomycorrhizal mycelial biomass of the invention, or a portion thereof, to produce an inoculated substrate; and (a) planting a seedling in the inoculated substrate, thereby colonizing the roots of the seedling, and/or (b) planting a seed in the inoculated substrate; and germinating the seed, thereby providing a seedling, wherein the roots of the seedling are colonized. Typically, the roots are inoculated and colonized as they are emerging from the seed. A seedling to be inoculated or colonized may be of any age or stage of growth. In some embodiments, the liquid suspension is applied at a rate of about 0.1 g to about 10 g of mycelia per seed or seedling (e.g., about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or 10 g of mycelia per seed or seedling, or any range or value therein; e.g., a range of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4 g/L to about 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10 g of mycelia per seed or seedling).

In some embodiments, the amount of mycelia applied per seed or seedling is calculated based on a volume applied over time (e.g., about 50 ml to about 100 ml (e.g., about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 ml) in about 3 seconds to about 20 seconds (e.g., about 3, 4, 5, 6, 7, 8, 9, 10, 11, 12, 13, 14, 15, 16, 17, 18, 19, or 20 sec)). Thus, if the desired amount of mycelium per seedling or tree is about 5 g and the amount of liquid suspension that is applied in, for example, about five seconds is, for example, about 100 ml, then the concentration of mycelium in the liquid suspension is about 5 g/100 ml. Any desired concentration or rate of application is readily determined for the particular setting.

A substrate for planting and growing a seed, seedling and/or plant/tree may be natural or synthetic (e.g., soil-less media). Any substrate may be used that holds water and can be buffered to a pH in the range of about 7 to about 8.5 (e.g., 7, 7.1, 7.2, 7.3, 7.4, 7.5, 8, 8.1, 8.2, 8.3, 8.4, 8.5, and any range or value therein), optionally a pH in the range of about 7.5 to about 8.5. In some embodiments, the pH of the substrate is about 7.9. Exemplary substrates include pine bark, peat moss, perlite, vermiculite, sand, humus, soil, lime, calcium carbonate screenings, or any combination thereof. The amount of mycelia for a substrate may be determined as described above for a seedling and/or tree.

In some embodiments, a method of producing a seed comprising ectomycorrhizal mycelia is provided, the method comprising inoculating the seed with the ectomycorrhizal mycelial biomass of the invention (e.g., a liquid suspension comprising the ectomycorrhizal mycelial biomass of the invention), to produce an seed coated with ectomycorrhizal mycelia. The seed comprising the ectomycorrhizal mycelia may be partially or entirely coated with the ectomycorrhizal mycelia (e.g., the seed coat may be partially or entirely coated with the ectomycorrhizal mycelia). The seed comprising the ectomycorrhizal mycelia may be germinated to produce a seedling comprising roots that are then colonized with the ectomycorrhizal mycelia, which may be grown to produce a plant/tree having roots colonized with the ectomycorrhizal mycelia. The amount of mycelia for inoculating a seed may be determined as described above for a seedling, tree and/or substrate.

In some embodiments, the present invention provides substrate inoculated with the ectomycorrhizal mycelial biomass of the invention (e.g., a liquid suspension comprising the ectomycorrhizal mycelial biomass of the invention), and comprising seeds and/or seedlings.

The present invention further provides a method of increasing truffle production of a tree, the method comprising inoculating a tree or a substrate (e.g., soil) in the root zone of the tree with a liquid suspension comprising the ectomycorrhizal mycelial biomass of the invention, wherein the roots of the tree re colonized by the mycelia of the ectomycorrhizal mycelial biomass in the liquid suspension, thereby increasing the truffle production of the tree. In some embodiments, inoculating comprises applying the liquid suspension at a rate of about 0.1 g to about 10 g of mycelia per tree/substrate as described herein, optionally, about 0.2 g to 0.5 g of mycelia per tree/substrate (e.g., about 0.2, 0.3, 0.4, or 0.5 g of mycelia per tree/substrate).

As used herein, the term "root zone of a tree" refers to an area that is immediately adjacent to the trunk of the tree at ground level to about 10 feet (e.g., about 305 cm) from the tree trunk (at ground level). In a typical truffle orchard, the trees are trimmed to keep the crowns smaller than they would naturally be if not trimmed. This results in the root zone extending beyond the tree crown (e.g., up to about 5-6 feet (e.g., about 5.1, 5.2, 5.3, 5.4, 5.5, 5.6, 5.7, 5.8. 5.9, or 6 ft; about 152 cm to about 185 cm (e.g., about 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, or 185 cm) past the crown of the tree). Trees in truffle orchards are also planted and trimmed so as to encourage quicker root growth and quicker intersecting of roots between adjacent trees. Intersecting of roots of adjacent trees encourages spread of the ectomycorrhizal mycelia resulting in more and earlier truffle production. In some embodiments, when inoculating a tree and/or the substrate (e.g., soil) in the root zone of the tree, the inoculating comprises injecting the liquid suspension into the substrate in which the tree is growing. Injecting may be carried out using any suitable agricultural implement, for example, a backpack sprayer equipped for injecting the liquid suspension into the substrate (e.g., soil).

A methods of the present invention produce seedlings and/or plants/trees having about 20% to about 100% of their roots colonized by the ectomycorrhizal mycelia from the ectomycorrhizal mycelial biomass of the invention (e.g., about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100%, or any range or value therein; e.g., about 20 to about 30, about 20 to about 40, about 20 to about 50, about 20 to about 60, about 20 to about 70, about 20 to about 80, about 20 to about 90, about 20 to about 95, about 20 to about 99, about 30 to about 40, about 30 to about 50, about 30 to about 60, about 30 to about 70, about 30 to about 80, about 30 to about 90, about 30 to about 100, about 40 to about 50, about 40 to about 60, about 40 to about 70, about 40 to about 80, about 40 to about 90, about 40 to about 100, about 50 to about 60, about 50 to about 70, about 50 to about 80, about 50 to about 90, about 50 to about 100, about 60 to about 70, about 60 to about 80, about 60 to about 90, about 60 to about 100, about 75 to about 80, about 75 to about 90, about 75 to about 100, about 80 to about 90, about 80 to about 100, about 90 to about 95, or about 90 to about 100% of their roots colonized by the ectomycorrhizal mycelia from the ectomycorrhizal mycelial biomass of the invention).

A liquid suspension comprising the ectomycorrhizal mycelial biomass of the present invention comprising the ectomycorrhizal MAT1-1 mycelia, ectomycorrhizal MAT1-2 mycelia and ectomycorrhizal male mycelia may comprise water or any other appropriate agriculturally acceptable carrier, wherein the mycelia is suspended in the water/agriculturally acceptable carrier. In some embodiments, the water may be tap water, bottled water, spring water, distilled water, double distilled water, and/or deionized water. In some embodiments, the water may be sterile. The water/agriculturally acceptable carrier may be mixed with mycelia having a particle size of about 10 microns to about 100 microns (e.g., about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 microns; e.g., about 30 to about 40, about 30 to about 50, about 30 to about 60, about 30 to about 70, about 30 to about 80, about 30 to about 90, about 30 to about 100, about 50 to about 60, about 50 to about 70, about 50 to about 80, about 50 to about 90, about 50 to about 100 microns, or any range or value therein).

In some embodiments, the liquid suspension may further comprise an adherent to assist in the sticking of the mycelia to the roots of a seedling or plant/tree. Such an adherent may be any compound or composition that can assist in the sticking of the mycelia to the roots of a seedling or plant/tree. In some embodiments, the adherent may be sucrose and/or glucose. In some embodiments, the sucrose and/or glucose may be present in the liquid suspension at a concentration of about 5 g/L to about 20 g/L (e.g., about 5, 6, 7, 8, 9, 10, 11, 12, 13, 14, 15, 16, 17, 18, 19, 20 g/L and any range or value therein; e.g., about 5 g/L to about 7 g/L, 5 g/L to about 10 g/L, about 5 g/L to about 15 g/L, about 7 g/L to about 10 g/L, about 7 g/L to about 15 g/L, about 7 g/L to about 20 g/L, about 10 g/L to about 15 g/L, about 10 g/L to about 20 g/L, or about 15 g/L to about 20 g/L). In some embodiments, an adherent useful with the invention may be a non-alcohol based hydrogel.

Any non-alcohol based hydrogel may be used as an adherent to assist in the sticking of the mycelia to the roots of a seedling or plant/tree as described herein (see, e.g., HyStem® and HydroMatrix™ (Sigma-Millipore) and/or TrueGel3D™ Buffer (Sigma-Aldrich). In some embodiments, the ratio of grams mycelium to milliliters (mL) of hydrogel when used as an adherent is about 0.0005:1 to about 0.001:1 (e.g., about 1 g mycelia:about 500 mL hydrogel). As an example, about 7.5 mL of hydrogel dilutes to 50 mL may be used to entrap about 1 g of mycelium.

An agriculturally acceptable carrier of the present invention can include natural or synthetic, organic or inorganic material which is combined with the active component to facilitate its application to a plant, plant part (e.g., seed, root), and/or substrate (e.g., soil). An agriculturally acceptable carrier includes, but is not limited to, inert components, dispersants, surfactants, adjuvants, tackifiers, stickers, binders, or combinations thereof, that can be used in agricultural formulations. In some embodiments, an agriculturally acceptable carrier may be water.

In some embodiments, an agriculturally acceptable carrier of the present invention comprises a surface active agent (surfactant), which can be an emulsifying, dispersing or wetting agent of ionic or nonionic type. Non-limiting examples of surface active agents suitable for use with a liquid suspension of the present invention, include alkyl benzene and alkyl naphthalene sulfonates, alkyl and alkyl aryl sulfonates, alkyl amine oxides, alkyl and alkyl aryl phosphate esters, organosilicones, fluoro-organic wetting agents, alkoxylated amines, sulfated fatty alcohols, long chain acid esters of sodium isothionate, esters of sodium sulfosuccinate, sulfated or sulfonated fatty acid esters, petroleum sulfonates, sulfonated vegetable oils, block copolymers, and polyoxyalkylene derivatives of the mono-higher fatty acid esters of hexitol anhydrides (e.g., sorbitan).

Non-ionic surface active agents useful with a liquid suspension of this invention include, but are not limited to, polyglycol ether derivatives of aliphatic or cycloaliphatic alcohols, saturated or non-saturated fatty acids and alkylphenols, which have 3 to 10 glycol ether groups and 8 to 20 carbon atoms in the (aliphatic) hydrocarbon residue and 6 to 18 carbon atoms in the alkyl residue of the alkyl phenols. Other non-limiting examples of suitable non-ionic surface active agents include the water-soluble, 20 to 200 ethylene glycol ether groups containing polyadducts of ethylene oxide and polypropylene glycol, ethylene diamino polypropylene glycol and alkyl polypropylene glycol with 1 to 10 carbon atoms in the alkyl moiety. Additional non-limiting examples of non-ionic surface active agents include nonylphenol polyethoxy ethanols, castor oil polyglycol ether, fatty acid esters of polyoxy ethylene sorbitan, such as polyoxy ethylene sorbitan trioleate, tributyl phenoxy polyethoxy ethanol, polyethylene glycol, Tween serials such as polyoxyethylene sorbitan monolaurate, polyoxyethylene sorbitan monopalmitate, polyoxyethylene sorbitan monooleate, and the like.

Non-limiting examples of dispersants useful with a liquid suspension of the present invention include methyl cellulose, polyvinyl alcohol, sodium lignin sulfonates, calcium lignosulfonates, polymeric alkyl naphthalene sulfonates, sodium naphthalene sulfonate, polymethylene binaphthalene sulfonate, and neutralized polyoxyethylated derivatives or ring-substituted alkyl phenol phosphates. In additional embodiments of this invention, a liquid suspension of the invention may further comprise stabilizers, such as magnesium aluminum silicate, xanthan gum and the like.

Accordingly, in some embodiments, a liquid suspension of the invention may be prepared by various means, e.g., by homogeneously mixing, grinding and/or blending mycelia with suitable carriers using conventional formulation techniques.

The liquid suspension of the present invention can be made in any formulation suitable for applying to or contacting with a plant, plant part or substrate. Formulations suitable for contacting the compositions of the invention to a plant or part thereof include, but are not limited to, a spray, a suspension, a mist, an aerosol, a foam, paste, emulsions (e.g., in oil (vegetable or mineral), or water or oil/water), a capsule, a powder, a granule, and combinations thereof.

Any truffle producing ectomycorrhizal fungus may be used with this invention. In some embodiments, an ectomycorrhizal fungus may be from the Tuberaceae family, the Morchellaceae family or the Terfeziacaea family. Ectomycorrhizal fungi may be further classified by Glade see, e.g., *Systematics and Ecology of Truffles (Tuber)* (Gregory D. Bonito, Duke University) (2009). For example, ectomycorrhizal fungi useful with this invention include, but are not limited to, fungi from the Rufum Clade (example species include, but are not limited to, *Tuber rufum, Tuber nitidum, Tuber lyonii*), the Melanosporum Clade (example species include, but are not limited to, *Tuber melanosporum, Tuber brumale, Tuber indicum*), the Aestivum Clade (example species include, but are not limited to, *Tuber aestivum* var. *aestivum, Tuber uncinatum* (syn. *Tuber aestivum* var. *uncinatum*), *Tuber mesentericum*), the Magnatum Clade (example species include, but are not limited to, *Tuber magnatum*), the Excavatum Clade (example species include, but are not limited to, *Tuber excavatum*), the Puberulum Clade (example species include, but are not limited to, *Tuber anniae, Tuber borchii, Tuber californicum*), the Maculatum Clade (example species include, but are not limited to, *Tuber maculatum, Tuber shearii*), the Gibbosum Clade (example species include, but are not limited to, *Tuber gibbosum, Tuber oregonense, Tuber bellisporum*), Canaliculatum/Macrosporum Clade (example species include, but are not limited to, *Tuber macrosporu, Tuber canaliculatum*), the Gennadii Clade (example species include, but are not limited to, *Tuber gennadii*), and/or the Tomentosum Clade (example species include, but are not limited to, *Tuber japonicum*).

In some embodiments, an ectomycorrhizal fungus useful with this invention may include, but is not limited to, the species of *Tuber melanosporum* (Black truffle, Perigord black truffle, Black Winter truffle), *Tuber brumale* (Black truffle, Muscat truffle, Winter truffle), *Tuber indicum* (Chinese black truffle), *Tuber himalayense* (Chinese truffle), *Tuber sinense* (Chinese truffle), *Tuber aestivum* (Black summer truffle), *Tuber uncinatum* (Syn. *Tuber aestivum* var.

*uncinatum*) (Black fall truffle, Burgundy truffle)), *Tuber magnatum* (Piedmont White truffle, Alba truffle, White Alba truffle), *Tuber macrosporum* (Smooth black truffle), *Tuber maculatum* (Garlic truffle), *Tuber borchii* (syn. *Tuber albidum* Pico) (Whiteish truffle, Bianchetto truffle, Bianchetti truffle)), *Tuber canaliculatum* (Appalachian truffle), *Tuber lyonii* (Pecan truffle), *Tuber gibbosum* (Oregon white truffle), *Tuber oregonense* (Oregon white truffle), *Tuber texense* (Texas truffle) (*Tuber lyonii* syn. *Texense*)), *Choiromyces meandriformis, Choiromyces aboriginum, Leucangium carthusianum* (Oregon Black Truffle), *Leucangium* spp. (UNC Herbarium, Accession Nos. NCU-F-0031570, and NCU-F-0031596) (Pink Summer Truffle), *Leucangium carthusianum* var. *purpureum, Kalapuya brunnea* (Oregon Brown Truffle), *Imaia gigantea, Terfezia arenaria, Terfezia boudieri, Terfezia claveryi, Terfezia leptoderma, Terfezia nivea, Terfezia pinoyi,* or *Mattirolomyces terfezioides (Terfezia terfezioides)* (Honey truffle; Sweet Hungarian Desert Truffle). An ectomycorrhizal mycelial biomass of the invention may comprise mycelia of a single ectomycorrhizal fungal species, or may include mycelia from more than one species, genera, Glade or family of ectomycorrhizal fungi.

Any species of tree that forms a symbiotic relationship with a truffle producing ectomycorrhizal fungus may be used with this invention. Thus, in some embodiments, a seed, seedling or tree useful with this invention may be from the family or subfamily of Pinaceae, Betulaceae, Corylaceae, Cistaceae, Dipterocarpaceae, Fagacea, Fabaceae, Pinacea, Ericacaea, Juglandacaea, Malvacaea, Myrtacaea, Nothofagacaea, Rosacaea, Salicacaea, Tiliaceae, Rhamnacae, Laricoideae, or Pinoideae. In some embodiments, the seed, seedling or tree may be from the genus of *Carpinus* spp., *Corylus* spp., *Alnus* spp., *Cistus* spp., *Helianthemum* spp., *Castanea* spp., *Fagus* spp., *Quercus* spp. (including, but not limited to, Section *Cerrus*; Section *Quercus*; Section *Mesobalanus*), *Pinus* spp., *Pseudotsuga* spp., *Abies* spp., *Dipterocarpus* spp., *Arctostaphlylos* spp., *Gaultheria* spp., *Kalmia* spp., *Carya* spp., *Tilia* spp., *Eucalyptus* spp., *Nothofagus* spp., *Dryas* spp., *Sorbus* spp., *Populus* spp., *Robinia* spp. (e.g., *Robinia pseudoacacia*), or *Salix* spp.

The present invention further provides methods of using the ectomycorrhizal mycelia produced as described herein and the culture media in which the ectomycorrhizal mycelia is grown. Thus, in some embodiments, a method of producing one or more internal polysaccharide (IPS) and/or volatile organic compound (VOC) is provided, the method comprising lyophilizing the ectomycorrhizal biomass of the invention to produce an ectomycorrhizal mycelial powder and extracting the ectomycorrhizal mycelial powder, thereby producing one or more IPS and/or VOC.

In some embodiments, a method of producing one or more external polysaccharide (EPS) and/or polypeptide (e.g., enzyme) is provided, the method comprising extracting one or more EPS and/or polypeptide from a culture medium in which the ectomycorrhizal biomass of the invention has been incubated/cultured/grown, thereby producing one or more EPS and/or polypeptide. In some embodiments, the one or more polypeptide may be xylanase, cellulase and/or amylase.

Methods of extracting IPS, VOC, EPS and polypeptides are known in the art and may be applied to obtain IPS, VOC, EPS and polypeptides from the mycelia and culture fluid in which the ectomycorrhizal mycelial biomass is grown.

In some embodiments, ectomycorrhizal mycelia may used to provide an enzyme additive. Thus, ectomycorrhizal mycelia produced as described herein may be lyophilized to produce an ectomycorrhizal mycelial powder, wherein the ectomycorrhizal mycelial powder comprises enzymes, which may be used as an enzyme additive. In some embodiments, the one or more polypeptides may be xylanase, cellulase and/or amylase.

The invention will now be described with reference to the following examples. It should be appreciated that these examples are not intended to limit the scope of the claims to the invention, but are rather intended to be exemplary of certain embodiments. Any variations in the exemplified methods that occur to the skilled artisan are intended to fall within the scope of the invention.

EXAMPLES

Example 1. Isolating Ectomycorrhizal Mycelia

A. Isolating Ectomycorrhizal Mycelia from Tree Roots

Maternal mycelia of MAT1-1 and MAT1-2 were collected from either an individual mycorrhiza from an infected plant or from the internal maternal tissue of a truffle fruiting body itself. To isolate from ectomycorrhizal infected plant/tree roots, roots were collected and the genera and species of the ectomycorrhizal fungi identified including *Tuber melanosporum, Tuber lyonii, Tuber canaliculatum, Tuber borchii, Tuber oregonense, Tuber gibbosum, Tuber aestivum, Tuber aestivum* var. *uncinatum, Terfezia claveryii, Leucangium carthusianum, Tuber macrosporum, Tuber japonicum, Tuber donnagotto, Tuber magnatum, Tuber brumale, Tuber maculatum, Tuber floridanum, Tuber californicum, Tuber mesentericum, Tuber maculatum, Tuber nitidum, Tuber anniea, Tuber shearii, Tuber gennadii, Tuber indicum, Tuber himalayense, Tuber bellisporum, Mattirolomyces terfezioides* and *Imaia gigantea. Tuber melanosporum, Tuber lyonii, Tuber canaliculatum, Tuber borchii, Tuber oregonense, Tuber gibbosum, Tuber aestivum, Tuber aestivum* var. *uncinatum, Terfezia claveryii, Leucangium carthusianum, Tuber macrosporum, Tuber japonicum, Tuber donnagotto, Tuber magnatum, Tuber brumale, Tuber maculatum, Tuber floridanum Tuber bellisporum, Mattirolomyces terfezioides* and *Imaia gigantea,* which represent the Tuberaceae clades of *Melanosporum, Rufum, Canaliculatum/Macrosporum, Gibbosum, Aestivum, Puberulum, Magnatum, Maculatum, Tomentosum,* and *Gennadii.* Additional species of the ectomycorrhizal fungi identified from ectomycorrhizal infected plant/tree roots were *Mattirolomyces terfezioides* and *Imaia gigantea.* Thus, this method is shown to work for a wide diversity of ectomycorrhizal fungi.

The roots were then placed in a 30 μm mesh bag, washed in an ultrasonic bath to free the roots from debris (e.g., soil, etc.), and then immersed in a wetting agent/detergent such as polysorbate 80 (Tween 80) or Triton X-100 at concentrations of about 2% v/v-10% v/v. After treatment, the roots were washed to remove excess detergent. The root tips were then immersed in the ultrasonic bath a second time with hydrogen peroxide (about 15-30% v/v) or sodium hypochlorite (about 2-10% v/v) for about 0.5-2 minutes. Following this procedure, the individual mycorrhizae were excised from the root tips and placed on agar (about 5-20 mycorrhizae per dish, pH 5.5-8.5; potato dextrose agar (PDA)/modified woody plant medium (mWPM)/Melin-Norkrans Modified Medium with streptomycin (10-100 mg/L agar medium)). The agar dishes inoculated with the isolated mycelia were then incubated at 20-35° C. for about 1-35 days. The cultures may then be stored at 4° C. for up to about one year. The cultures may be sub-cultured on PDA or mWPM.

Using the methods of the invention, ectomycorrhizal fungi were successfully identified and cultured from *Tuber*

*melanosporum, Tuber lyonii, Tuber canaliculatum, Tuber borchii, Tuber oregonense, Tuber gibbosum, Tuber aestivum, Tuber aestivum* var. *uncinatum, Terfezia claveryii, Leucangium carthusianum, Tuber macrosporum, Tuber japonicum, Tuber donnagotto, Tuber magnatum, Tuber brumale, Tuber maculatum, Tuber floridanum, Tuber californicum, Tuber mesentericum, Tuber maculatum, Tuber nitidum, Tuber anniea, Tuber shearii, Tuber gennadii, Tuber indicum, Tuber himalayense, Tuber bellisporum, Mattirolomyces terfezioides* and *Imaia gigantea* showing that these methods work for a wide diversity of ectomycorrhizal fungi.

B. Isolating Ectomycorrhizal Mycelia from Truffle Fruiting Bodies

An immature or mature truffle fruiting body was surface sterilized with either hydrogen peroxide or sodium hypochlorite using the same parameters as above. Small pieces of gleba (about 1 mm-5 mm in size (e.g., 1, 1.5, 2, 2.5, 3, 3.5, 4, 4.5, 5 mm) were placed on the same agar and incubated under the same conditions as described above (for isolation from tree roots). This process has been carried out successfully for numerous truffle species including *Tuber melanosporum, Tuber lyonii, Tuber canaliculatum, Tuber borchii, Tuber oregonense, Tuber gibbosum, Tuber aestivum, Tuber aestivum* var. *uncinatum, Terfezia claveryii, Leucangium carthusianum, Leucangium* spp. (UNC Herbarium, Accession Nos. NCU-F-0031570, and NCU-F-0031596), *Tuber macrosporum, Tuber japonicum, Tuber donnagotto, Tuber magnatum, Tuber brumale, Tuber maculatum, Tuber floridanum, Tuber californicum, Tuber mesentericum, Tuber maculatum, Tuber nitidum, Tuber anniea, Tuber shearii, Tuber gennadii, Tuber indicum, Tuber himalayense, Tuber bellisporum, Mattirolomyces terfezioides* and *Imaia gigantea* showing that these methods work for a wide diversity of ectomycorrhizal fungi. It is noted that *Tuber melanosporum, Tuber lyonii, Tuber canaliculatum, Tuber borchii, Tuber oregonense, Tuber gibbosum, Tuber aestivum, Tuber aestivum* var. *uncinatum, Tuber macrosporum, Tuber japonicum, Tuber donnagotto, Tuber magnatum, Tuber brumale, Tuber maculatum, Tuber floridanum, Tuber californicum, Tuber mesentericum, Tuber maculatum, Tuber nitidum, Tuber anniea, Tuber shearii, Tuber gennadii, Tuber indicum, Tuber himalayense,* and *Tuber bellisporum*, represent the Tuberaceae clades of *Melanosporum, Aestivum, Gibbosum, Tomentosum, Gennadii, Maculatum, Magnatum, Rufum, Canaliculatum/Macrosporum,* and *Puberulum*.

C. Isolating Ectomycorrhizal Mycelia from Spores

A small slice (about 1-5 mm) of the mature fruiting body was excised and examined under a microscope to identify both number and quality of spores (dark spores enclosed by a thick ascus; no empty ascus.). Once the presence of high-quality, numerous spores was confirmed, the truffle was surface sterilized by briefly immersing the fruiting body in alcohol (e.g., ethanol and/or isopropyl alcohol). The alcohol was then burned off (about 5-30 seconds depending on thickness of truffle peridium (exterior layer) and the number of holes/points of exposure in the truffle). The truffle was then frozen at about −30 to −86° C. and lyophilized. Lyophilization was carried out at a temperature of from about −20 to about −30° C. and at a pressure in the range from about 0.075 to about 0.255 ton. Following lyophilization, the truffles were mechanically crushed to a fine powder and sifted/re-fragmented until the powder particle size was about 0.5 mm to about 0.75 mm. The lyophilized truffle powder, which contains asci and spores, was then stored at 4° C. until further use.

To germinate the spores, the lyophilized truffle powder (about 0.01 g to about 0.2 g) was surface sterilized in hydrogen peroxide or sodium hypochlorite (2-10% v/v) for about 0.5 to about 2 minutes. The spores were then transferred into a vial (e.g., about 10-25 mL plastic vial with cap) containing distilled water (pH 5.5-8.0). A lytic enzyme (e.g., helicase or t β-glucuronidase (e.g., snail digestive enzyme, e.g., *Helix pomatia*) was added at concentration of about 1% to about 4% for a period of about 2 to about 24 hours. The vial was then rinsed at least 2 times (e.g., 2, 3, 4, 5, 6, times or more) with sodium hypochlorite (about 0.5% to about 8%) with streptomycin (about 10 to about 100 mg/L; about 35 mg/L). Using about a 10 micron to a 100 micron sieve, the liquid in the vial was then separated from the spores and the spores placed onto the agar described above for isolation of mycelia from tree roots (A).

Alternatively, spores were germinated by placing the lyophilized truffle powder (about 0.01 g to about 2 g) prepared as described above in a sterile vial with oak root exudate concentrate. Oak root exudate was prepared by surface sterilizing oak root tips that are free of mycorrhizae using the methods for sterilizing provided with the methods for isolating mycelia from root tips (A) above. Sterile water was then run over the oak root tips in a 10-100 um mesh bag and the concentrate applied to the surface-sterilized spores placed on agar dish. These processes have been carried out successfully for a wide variety of truffle species including *Tuber melanosporum, Tuber lyonii, Tuber borchii, Tuber magnatum, Tuber macrosporum, Tuber brumale, Tuber bellisporum, Tuber mesentericum, Tuber rufum, Tuber canaliculatum, Tuber aestivum, Tuber aestivum* var. *uncinatum Terfezia claveryii,* and *Leucangium carthusianum*. The Tuberaceae clades represented by these fungal species include *Melanosporum, Magnatum, Canaliculatum/Macrosporum, Aestivum, Rufum, Gibbosum,* and *Puberulum*.

D. Determination of Mating Type

The mycelia isolated using these various methods were analyzed to determine mating type and sex (e.g., via PCR). This ensures that the desired mixture of mycelial types are available for selecting for producing of the ectomycorrhizal biomass of the invention. The mating types were determined using the P_19, P_20, P_1 and P_2 primers as described herein.

Using these methods, specific isolation of highly productive strains of truffle mycelia is possible, as well as those having superior organoleptic, hardiness, consistency, growth rate, and other characteristics.

Example 2. Pre-Culturing of the Ectomycorrhizal Mycelia

In some cases, it may be advantageous to pre-culture the ectomycorrhizal mycelia prior to incubating it in a bioreactor as it can increase the amount of mycelia available for inoculating and incubating, thereby increasing the biomass output of the bioreactor.

A. Pre-culturing to produce a mycelial composition comprising ectomycorrhizal MATT-1, MATT-2 and male mycelia. Agar chucks (e.g., about 0.01-10 g of inoculated agar) of ectomycorrhizal cultures from each of the identified types of ectomycorrhizae (e.g., MAT1-1, MAT1-2 and male), which were stored for about a week at 4° C., were added to a culture flask (volume about 100 ml) (e.g., rotary evaporator or rotary shaker) containing about 40 ml of the following pre-culture media: about 35 g/L of glucose, about 5 g/L of peptone, about 2.5 g/L of yeast extract, about 2.5 g of $KH_2PO4$, about 1 g/L of $MgSO4$, and about 0.05 g/L of Thiamine-HCL, pH 5.5. The flask with the pre-culture media and agar were incubated at about 25° C. for about 5 days with agitation at a speed of about 150 rpm. Many different ectomycorrhizal species have been pre-cultured prior to culturing, e.g., in a bioreactor, including *Tuber lyonii, Tuber macrosporum, Tuber melanosporum, Tuber borchii, Tuber magnatum, Tuber bellisporum, Tuber canaliculatum, Tuber indicum, Tuber himalayense, Tuber maculatum, Tuber oregonense*, and *Tuber gibbosum*.

B. Culturing the mycelial composition to produce a mycelial mixture comprising MAT1-1, MAT1-2 and male mycelia. All or a portion of the culture fluid from pre-cultured ectomycorrhizal mycelia (comprising the MAT1-1, MAT1-2 and male ectomycorrhizae) was transferred to a flask (volume of about 500 ml) containing about 180 mL of the pre-culture media described above. The flask (e.g., rotary evaporator or rotary shaker) was incubated for about 2 days at about 25° C. with an agitation at a speed of about 150 rpm.

Example 3. Cultivating Ectomycorrhizal Mycelia in a Bioreactor

All or a portion of the mycelial mixture (B) described above was transferred to a bioreactor containing a culture media comprising about 5 g/L of yeast extract, about 5 g/L of peptone, about 80 g/L of sucrose, about 0.05 g/L thiamine-HCL, about 5 mm of KCl, about 30 mm of MgCl2, at pH 5.5 with about 30% dissolved oxygen. Supplemental oxygen may be added to maintain the desired level of dissolved oxygen. The mycelial mixture was incubated in the bioreactor for about 15 to about 30 days (about 10 days, about 12 days, about 15 days, about 20 days).

The cultures in the bioreactor were pulse fed (batch fed) with about 1.7 g/L peptone and about 8 g/L yeast extract (e.g., a nitrogen source) at about every third day, e.g., on day 3, day 6, and day 9 from the start of incubation, as needed during incubation.

When the cultivation in the bioreactor was completed, the liquid was drained off using a sieve having a particle opening size of about 30 microns. The mycelia was rinsed with sterile distilled water until clean, moved into a storage vessel, and stored.

A number of different ectomycorrhizal species have been cultured in a bioreactor as described herein including *Tuber lyonii, Tuber macrosporum, Tuber melanosporum, Tuber borchii, Tuber magnatum, Tuber bellisporum, Tuber canaliculatum, Tuber indicum, Tuber himalayense, Tuber maculatum, Tuber oregonense*, and *Tuber gibbosum*, which represent the Rufum Clade, *Canaliculatum/Macrosporum* Clade, *Melanosporum* Clade, *Puberulum* Clade, *Magnatum* Clade, *Gibbosum* Clade, and *Maculatum* Clade to produce about a hundred fold increase in the amount of mycelium as compared to the amount inputted/inoculated into the bioreactor.

Example 4. Storage of the Mycelial Biomass

Short-term storage: Mycelia were placed in a sterile, breathable bag and placed at −10° C. to −4° C. Storage at this temperature may be for about 1 day to about 2 weeks. Intermediate-term storage: Mycelia were placed into vacuum-sealed plastic bags and stored in a temperature-controlled freezer at a temperature of about −40° C. to −86° C. The mycelia may be thawed (e.g., at about 30° C.) later for use.

Long-term storage: Using the methods described in Piattoni et al. (*Cryo Letters* 38(1):58-64 (2017)) the mycliea from the bioreactor were cryopreserved in liquid nitrogen. Cryopreserved tuber mycelia are viable under liquid nitrogen conditions for several years. To re-activate, cryopreserved mycelium may be thawed in 30° C. water for use.

Various species have been stored successfully as described herein and later thawed for inoculating cultures, substrates, seeds, seedlings, trees, orchards and the like as described herein, including *Tuber lyonii, Tuber macrosporum, Tuber melanosporum, Tuber borchii, Tuber magnatum, Tuber canaliculatum, Tuber oregonense*, which are representative of the *Rufum* Clade, *Canaliculatum/Macrosporum* Clade, *Melanosporum* Clade, *Puberulum* Clade, *Magnatum* Clade, and *Gibbosum* Clade.

Example 5. Inoculation of Seeds, Seedlings, and Trees

A liquid suspension comprising the ectomycorrhizal mycelial biomass (comprising ectomycorrhizal MAT1-1 mycelia, ectomycorrhizal MAT1-2 mycelia, and ectomycorrhizal male mycelia) was added to a seed bed (i.e., the substrate in seed bed) in which seeds had been sowed. The amount of liquid suspension was added upon germination at about 0.2 g to about 0.5 g per seed. The liquid suspension may also be added was added prior to the planting of the seeds, or at the same time as the planting of the seeds or after the planting of the seeds but prior to germination. The roots of the seedlings are colonized upon emergence from the seed.

This process has been carried out with various truffle species and tree species/genera to successfully produce seeds, seedlings and trees inoculated with the selected truffle species, including:

*Tuber melanosporum* (Black Perigord Truffle) and the tree species of *Quercus ilex* ssp. *rotundifolia* (Syn. *Quercus rotundifolia, Quercus muehlenbergii*), *Quercus faginea, Quercus pontica, Quercus coccifera, Quercus robur, Corylus chinensis, Corylus heterophylla, Corylus avellana, Corylus cornuta, Corylus colurna, Corylus americana, Corylus fargesii*, and *Corylus maxima;*

*Tuber lyonii* and the tree species of *Carya* spp.;

*Tuber canaliculatum* and the tree species of *Carpinus caroliniana* and *Carpinus betulus;*

*Tuber borchii* and the tree species of *Pinus pinea;*

*Tuber macrosporum* and the tree species of *Corylus avellana* 'Jefferson' (Oregon State University release #703.007), *Quercus faginea, Corylus americana, Corylus cornuta, Corylus avellana, Corylus heterophylla,* and *Corylus maxima;*

*Tuber oregonense* and the tree species of *Pseudotsuga menziesii,*

*Tuber gibbosum* and the tree species of *Pseudotsuga menziesii,* and

*Leucangium carthusianum* and the tree species of *Pseudotsuga menziesii.*

In addition to the method described above, seedlings may be inoculated using a liquid suspension comprising the ectomycorrhizal mycelial biomass (comprising ectomycorrhizal MAT1-1 mycelia, ectomycorrhizal MAT1-2 mycelia, and ectomycorrhizal male mycelia) that is injected or mixed with a growth substrate in which the seedlings are growing. The liquid suspension may be prepared and added so as to provide an amount of mycelium from about 0.1 g to about 10 g mycelia per seedling/tree as described herein, optionally 0.2 g to about 0.5 g per seedling/tree. The liquid suspension comprising the mycelia may be added to a growth substrate prior to the planting of the seedlings, at the same time as planting the seedlings or after the planting of the seedlings.

A liquid suspension comprising mycelia of *Terfezia claveryi* was used to inoculate a growth substrate in which seedlings and/or trees of *Cistus* spp. and *Helianthemum* spp. are growing as described herein resulting in the successful colonization of the seedlings and trees.

Using either method, within about 1 month to about 3 months, the ectomycorrhizal fungi colonize the roots of the seedling. The rate of colonization of the roots is about 20% to about 100%.

Example 6. Inoculation of Truffle Orchards

A liquid suspension comprising the ectomycorrhizal mycelial biomass of the invention (comprising ectomycorrhizal MAT1-1 mycelia, ectomycorrhizal MAT1-2 mycelia, and ectomycorrhizal male mycelia) may be used to inoculate the soil around a tree in a truffle orchard to improve productivity. In order for mycorrhized truffle trees to produce in an orchard setting, both MAT1-1 and MAT1-2 mating types (maternal) must be present and male mycelia need to be present. Because the liquid suspension comprises the ectomycorrhizal mycelial biomass of the invention, which in turn comprises each of these mycelial types, it can be used in an efficient and cost effective manner to generate a productive truffle orchard or to improve productivity in a truffle orchard by re-introducing both female MAT components and male components.

The mycelia in the liquid suspension are incorporated into the soil using, for example, a backpack sprayer having an injection nozzle. The liquid suspension for use in inoculating the soil in a truffle orchard includes sucrose (as an adherent) at a concentration of about 5 g/L. The liquid suspension is added to the soil inside or at the root zone. The liquid suspension is applied at four positions (e.g., N, S, E, W) within the root zone of each tree. Typically, mycorrhization of the trees is improved within about 1 month to about 3 months. Application of the liquid suspension may be repeated as needed.

These methods have been carried out for a wide variety of tree and fungal combinations including

*Tuber melanosporum* with the tree species of *Quercus robur*, *Quercus macrocarpa*, *Quercus alba*, *Quercus ilex* ssp. *rotundifolia* (syn. *Quercus rotundifolia*), *Quercus faginea*, *Quercus muehlenbergii*, *Quercus coccifera*, *Corylus avellana*, *Corylus americana*, *Corylus cornuta*, *Corylus heterophylla*, *Castanea* ssp., and *Pinus pinea*;

*Tuber macrosporum* with the tree species of *Quercus alba*, *Quercus faginea*, *Quercus robur*, *Corylus avellana*, *Corylus cornuta*, and *Corylus americana*;

*Tuber lyonii* with the tree species of *Carya illinoiensis*;

*Tuber aestivum* with the tree species of *Corylus avellana*, *Corylus americana*, *Quercus robur*, and *Castanea* spp.

*Tuber uncinatum* with the tree species of *Castanea* spp., *Quercus faginea*, *Quercus robur*, *Corylus avellane*, and *Corylus americana*;

*Tuber borchii* with the tree species of *Pinus pinea*, *Pinus strobus*, and *Pinus taeda*, resulting in the successful colonization of the tree roots with the selected truffle species.

The foregoing is illustrative of the present invention, and is not to be construed as limiting thereof. The invention is defined by the following claims, with equivalents of the claims to be included therein.

That which is claimed is:

1. A method of cultivating an ectomycorrhizal ascomycete, the method comprising:
providing i) ectomycorrhizal MAT1-1 mycelia, ii) ectomycorrhizal MAT1-2 mycelia, and iii) ectomycorrhizal male mycelia of the ectomycorrhizal ascomycete; and
incubating the ectomycorrhizal MAT1-1 mycelia, ectomycorrhizal MAT1-2 mycelia, and ectomycorrhizal male mycelia in a culture medium in vitro for about 3 days to about 50 days, thereby producing an ectomycorrhizal ascomycete biomass comprising the MAT1-1 ectomycorrhizal mycelia, the MAT1-2 ectomycorrhizal mycelia, and the male ectomycorrhizal mycelia.

2. The method of claim 1, wherein the incubating is carried out in a bioreactor.

3. The method of claim 1, wherein
the incubating is performed at a temperature of about 20° C. to about 35° C. and/or the culture medium is at a pH of about 5 to about 8.5.

4. The method of claim 2, wherein the incubating comprises agitating the culture medium, optionally wherein the agitating is performed at a speed of about 50 rpm to about 500 rpm.

5. The method of claim 1, wherein the culture medium comprises a carbon source and a nitrogen source, optionally, wherein (a) (i) the carbon source is sucrose, glucose and/or starch and/or (ii) the carbon source is present in the culture medium at a concentration of about 1 g/L to about 100 g/L, and/or (b) (i) the nitrogen source is peptone, yeast extract, tryptone and/or corn steep liquor and/or (ii) the nitrogen source is present in the culture medium at a concentration of about 1 g/L to about 10 g/L.

6. The method of claim 1, wherein the culture medium further comprises thiamine-HCl, biotin, potassium and/or magnesium.

7. The method of claim 1, wherein prior to incubating, the culture medium is inoculated with a mycorrhized root comprising the ectomycorrhizal MAT1-1 mycelia, the ectomycorrhizal MAT1-2 mycelia, and the ectomycorrhizal male mycelia, optionally, further comprising, prior to incubating, pre-culturing the ectomycorrhizal MAT1-1 mycelia, ectomycorrhizal MAT1-2 mycelia, and ectomycorrhizal male mycelia in a pre-culture medium for one day to about 30 days, thereby producing a mycelial composition and optionally
combining at least a portion of the mycelial composition and a fresh culture medium to provide a first pre-cultured mycelial mixture; and
culturing the first pre-cultured mycelial mixture to provide a second pre-cultured mycelial mixture.

8. The method of claim 7, wherein (i) prior to incubating, the culture medium is inoculated with at least a portion of the mycelial composition and/or the second pre-cultured mycelial mixture, (ii) the pre-culturing step and/or the culturing of the first pre-cultured mycelial mixture is carried out for about 1 day to 30 days, (iii) the pre-culturing step and/or the culturing of the first pre-cultured mycelial mixture is carried out at a temperature of 20° C. to about 35° C., (iv) the pre-culturing step and/or the culturing of the first pre-cultured mycelial mixture is carried out at a pH of about 5 to about 8.5, (v) the pre-culturing step comprises agitating the pre-culture medium and/or the culturing of the first pre-cultured mycelial mixture comprises agitating the pre-culture mixture optionally, wherein the agitating is performed at a speed of about 50 rpm to about 500 rpm, or (vi) any combination of (i)-(v).

9. The method of claim 8, wherein the pre-culture medium for the pre-culturing step and/or the fresh culture medium for the culturing of the first pre-cultured mycelial mixture comprises a carbon source and/or a nitrogen source, optionally, wherein (a) the carbon source is starch, sucrose and/or glucose and/or the carbon source is present in the pre-culture medium or the fresh culture medium at a concentration of about 1 g/L to about 80 g/L and/or (b) the nitrogen source is peptone, yeast extract, tryptone and/or corn steep liquor and/or the nitrogen is present in the pre-culture medium or the fresh culture medium at a concentration of about 1 g/L to about 10 g/L.

10. The method of claim 8, wherein prior to incubating, the culture medium is inoculated with mycorrhized roots and with at least a portion of the mycelial composition and/or the second pre-cultured mycelial mixture.

11. The method of claim 1, further comprising adding at least one nutrient to the culture medium during the incubating of the ectomycorrhizal MAT1-1 mycelia, ectomycorrhizal MAT1-2 mycelia, and ectomycorrhizal male mycelia optionally, wherein (a) the at least one nutrient is a nitrogen source and/or a carbon source, (b) the nitrogen source is added to the culture medium to achieve a concentration of about 1 g/L to about 50 g/L, optionally a concentration of about 1 g/L to about 10 g/L, (c) the nitrogen source is peptone, yeast extract, tryptone and/or corn steep, (d) the carbon source is starch, sucrose and/or glucose, (e) the carbon source is added to the culture medium to achieve a concentration of about 1 g/L to about 50 g/L, (f) at least one nutrient is added every 2 days or every 3 days, or any combination thereof, or (g) any combination of (a)-(f).

12. The method of claim 1, further comprising separating the ectomycorrhizal ascomycete biomass from the culture medium, optionally wherein the separating comprises filtering the ectomycorrhizal ascomycete biomass via filtration.

13. The method of claim 1, wherein the ectomycorrhizal ascomycete biomass is produced in an amount of about 1 g/L to about 150 g/L and optionally,
(a) further comprising freezing the ectomycorrhizal ascomycete biomass to produce a frozen ectomycorrhizal ascomycete biomass optionally, wherein the freezing is at a temperature of about −86° C. to about −40° C. to produce a frozen ectomycorrhizal ascomycete biomass, optionally storing the frozen ectomycorrhizal ascomycete biomass for about 1 day to about 10 years, or
(b) further comprising storing the ectomycorrhizal ascomycete biomass at a temperature of more than 0° C. to about 4° C.

14. The method of claim 13 further comprising cryopreserving the ectomycorrhizal ascomycete biomass in liquid nitrogen to produce a cryopreserved ectomycorrhizal ascomycete biomass, and optionally storing the cryopreserved ectomycorrhizal ascomycete biomass for about one day to about 10 years.

15. The method of claim 1, wherein
prior to incubating, the ectomycorrhizal MAT1-1 mycelia and/or the ectomycorrhizal MAT1-2 mycelia are (a) isolated from (i) a plant root tip infected with an ectomycorrhizal fungus or (ii) an ectomycorrhizal fungal fruiting body; and/or are (b) isolated from germinated spores that are isolated from a mature ectomycorrhizal fungal fruiting body and/or
prior to incubating, the ectomycorrhizal male mycelia are isolated from germinated spores that are isolated from a mature ectomycorrhizal ascomycete fruiting body.

16. The method of claim 1, wherein the ectomycorrhizal fungi are ascomycete is from the family of Tuberaceae, Morchellaceae or Terfeziacaea, optionally wherein the ectomycorrhizal fungi are from the species of *Tuber melanosporum* (Black truffle, Perigord black truffle, Black Winter truffle), *Tuber brumale* (Black truffle, Muscat truffle, Winter truffle), *Tuber aestivum* (Black summer truffle), *Tuber uncinatum* (syn. *Tuber aestivum* var. *uncinatum*) (Black fall truffle, Burgundy truffle)), *Tuber mesentericum, Tuber magnatum* (Piedmont White truffle, Alba truffle, White Alba truffle), *Tuber macrosporum* (Smooth black truffle), *Tuber maculatum* (Garlic truffle), *Tuber shearii, Tuber borchii* (syn. *Tuber albidum Pico*) (Whiteish truffle, Bianchetto truffle, Bianchetti truffle)), *Tuber anniae, Tuber californicum, Tuber canaliculatum* (Appalachian truffle), *Tuber lyonii* (Pecan truffle), *Tuber rufum, Tuber nitidum, Tuber gibbosum* (Oregon white truffle), *Tuber excavatum, Tuber oregonense* (Oregon white truffle), *Tuber bellisporum, Tuber gennadii, Tuber japonicum, Tuber texense* (Texas truffle) (*Tuber lyonii* syn. *Texense*)), *Choiromyces meandriformis, Leucangium carthusianum* (Oregon Black Truffle), *Leucangium* spp. (Pink Summer Truffle), *Leucangium carthusianum* var. *purpureum, Kalapuya brunnea* (Oregon Brown Truffle), *Imaia gigantea, Terfezia arenaria, Terfezia boudieri, Terfezia claveryi, Terfezia leptoderma, Terfezia nivea, Terfezia pinoyi*, or *Mattirolomyces terfezioides* (*Terfezia terfezioides*) (Honey truffle; Sweet Hungarian Desert Truffle).

17. The method of claim 15, wherein the germinated spores are prepared by contacting the spores of the ectomycorrhizal ascomycete with a lytic enzyme and/or a plant root exudate.

18. The method of claim 17, wherein the lytic enzyme comprises a helicase and/or a β-glucuronidase.

19. The method of claim 17, wherein the plant root exudate comprises an oak root exudate.

20. The method of claim 1, wherein the ectomycorrhizal ascomycete is a hypogeous ascomycete.

21. An ectomycorrhizal ascomycete biomass produced by a method comprising:
providing i) ectomycorrhizal MAT1-1 mycelia, ii) ectomycorrhizal MAT1-2 mycelia, and iii) ectomycorrhizal male mycelia of the ectomycorrhizal ascomycete; and
incubating the ectomycorrhizal MAT1-1 mycelia, ectomycorrhizal MAT1-2 mycelia, and ectomycorrhizal male mycelia in a culture medium in vitro for about 3 days to about 50 days, thereby producing an ectomycorrhizal ascomycete biomass comprising the MAT1-1 ectomycorrhizal mycelia, the MAT1-2 ectomycorrhizal mycelia, and the male ectomycorrhizal mycelia.

22. A method of producing a substrate for planting a seed or a seedling, the method comprising inoculating the substrate with a liquid suspension comprising the ectomycorrhizal ascomycete biomass of claim 21, or a portion thereof, thereby producing a substrate for planting a seed or seedling, optionally wherein the substrate is inoculated with the liquid suspension prior to, concurrently with, or after planting a seed or seedling in the substrate.

23. The method of claim 22, wherein the seed or seedling is from the family or subfamily of Betulaceae, Corylaceae, Cistaceae, Dipterocarpaceae, Fagacea, Fabaceae, Pinaceae, Ericacaea, Juglandacaea, Malvacaea, Myrtacaea, Nothofagacaea, Rosacaea, Salicacaea, Tiliaceae, Rhamnacae, Laricoideae, or Pinoideae, optionally, wherein the seed, seedling is from the from the genus of *Carpinus* spp., *Corylus* spp., *Alnus* spp., *Cistus* spp., *Helianthemum* spp., *Castanea* spp., *Fagus* spp., *Quercus* spp. *Quercus* spp. Section Cerrus; *Quercus* spp. Section *Quercus*; *Quercus* spp. Section *Mesobalanus, Pinus* spp., *Pseudotsuga* spp., *Abies* spp., *Dipterocarpus* spp., *Arctostaphlylos* spp., *Gaultheria* spp., *Kalmia* spp., *Carya* spp., *Tilia* spp., *Eucalyptus* spp., *Nothofagus* spp., *Dryas* spp., *Sorbus* spp., *Populus* spp., *Robinia* spp., or *Salix* spp.

24. A method of colonizing roots of a seedling with ectomycorrhizal ascomycete mycelia, the method comprising:
(a) inoculating a seedling with a liquid suspension comprising the ectomycorrhizal ascomycete biomass of claim 21, or a portion thereof, thereby colonizing the roots of the seedling, or
(b) inoculating a substrate for planting a seed and/or seedling with a liquid suspension comprising the ectomycorrhizal ascomycete biomass of claim 21, or a portion thereof, to produce an inoculated substrate; and
(i) planting a seedling in the inoculated substrate, thereby colonizing the roots of the seedling, and/or
(ii) planting a seed in the inoculated substrate; and germinating the seed to produce a seedling, thereby colonizing the roots of the seedling.

25. The method of claim 24, wherein about 20% to about 100% of the roots of the seedling are colonized, optionally wherein the seedling is grown into a plant having about 20% to about 100% of its roots colonized.

26. A method of increasing truffle production by a tree, the method comprising:
inoculating a tree or a substrate in the root zone of the tree with a liquid suspension comprising the ectomycorrhizal ascomycete biomass of claim 21, thereby increasing the truffle production of the tree.

27. The method of claim 26, wherein the tree is from the family or subfamily of Betulaceae, Corylaceae, Cistaceae, Dipterocarpaceae, Fagacea, Fabaceae, Pinaceae, Ericacaea, Juglandacaea, Malvacaea, Myrtacaea, Nothofagacaea, Rosacaea, Salicacaea, Tiliaceae, Rhamnacae, Laricoideae, or Pinoideae, optionally, wherein the tree is from the from the genus of *Carpinus* spp., *Corylus* spp., *Alnus* spp., *Cistus* spp., *Helianthemum* spp., *Castanea* spp., *Fagus* spp., *Quercus* spp. *Quercus* spp. *Section* Cerrus; *Quercus* spp. Section *Quercus*; *Quercus* spp. Section *Mesobalanus, Pinus* spp., *Pseudotsuga* spp., *Abies* spp., *Dipterocarpus* spp., *Arctostaphlylos* spp., *Gaultheria* spp., *Kalmia* spp., *Carya* spp., *Tilia* spp., *Eucalyptus* spp., *Nothofagus* spp., *Dryas* spp., *Sorbus* spp., *Populus* spp., *Robinia* spp., or *Salix* spp.

* * * * *

SEQUENCE LISTING

```
<160> NUMBER OF SEQ ID NOS: 16

<210> SEQ ID NO 1
<211> LENGTH: 20
<212> TYPE: DNA
<213> ORGANISM: Artificial
<220> FEATURE:
<223> OTHER INFORMATION: primer

<400> SEQUENCE: 1
taggcaaacg atcagtggag                                               20

<210> SEQ ID NO 2
<211> LENGTH: 23
<212> TYPE: DNA
<213> ORGANISM: Artificial
<220> FEATURE:
<223> OTHER INFORMATION: primer

<400> SEQUENCE: 2
aaagacgaag ttatctggcc tga                                           23

<210> SEQ ID NO 3
<211> LENGTH: 24
<212> TYPE: DNA
<213> ORGANISM: Artificial
<220> FEATURE:
<223> OTHER INFORMATION: primer

<400> SEQUENCE: 3
ggtaaccaaa tcggtgctgc tttc                                          24
```

```
<210> SEQ ID NO 4
<211> LENGTH: 24
<212> TYPE: DNA
<213> ORGANISM: Artificial
<220> FEATURE:
<223> OTHER INFORMATION: primer

<400> SEQUENCE: 4
accctcagtg tagtgaccct tggc                                               24

<210> SEQ ID NO 5
<211> LENGTH: 22
<212> TYPE: DNA
<213> ORGANISM: Artificial
<220> FEATURE:
<223> OTHER INFORMATION: primer

<400> SEQUENCE: 5
tgatatgctt aagttcagcg gg                                                 22

<210> SEQ ID NO 6
<211> LENGTH: 25
<212> TYPE: DNA
<213> ORGANISM: Artificial
<220> FEATURE:
<223> OTHER INFORMATION: primer

<400> SEQUENCE: 6
caatctcact cgtgatgtct gggtc                                              25

<210> SEQ ID NO 7
<211> LENGTH: 26
<212> TYPE: DNA
<213> ORGANISM: Artificial
<220> FEATURE:
<223> OTHER INFORMATION: primer

<400> SEQUENCE: 7
tctcgggctg gaggtgcggg tcgagt                                             26

<210> SEQ ID NO 8
<211> LENGTH: 26
<212> TYPE: DNA
<213> ORGANISM: Artificial
<220> FEATURE:
<223> OTHER INFORMATION: primer

<400> SEQUENCE: 8
gccttgggtt ttagcatctc aactgg                                             26

<210> SEQ ID NO 9
<211> LENGTH: 28
<212> TYPE: DNA
<213> ORGANISM: Artificial
<220> FEATURE:
<223> OTHER INFORMATION: primer

<400> SEQUENCE: 9
cgattgatga tcggctcctt gatttctc                                           28

<210> SEQ ID NO 10
<211> LENGTH: 25
<212> TYPE: DNA
<213> ORGANISM: Artificial
<220> FEATURE:
<223> OTHER INFORMATION: primer
```

```
<400> SEQUENCE: 10
agaaaggagg tggaggagag aatga                                          25

<210> SEQ ID NO 11
<211> LENGTH: 22
<212> TYPE: DNA
<213> ORGANISM: Artificial
<220> FEATURE:
<223> OTHER INFORMATION: primer

<400> SEQUENCE: 11
atgatgcctt tgtgctttcc tc                                             22

<210> SEQ ID NO 12
<211> LENGTH: 22
<212> TYPE: DNA
<213> ORGANISM: Artificial
<220> FEATURE:
<223> OTHER INFORMATION: primer

<400> SEQUENCE: 12
cgttcatccc caatgtaaga gt                                             22

<210> SEQ ID NO 13
<211> LENGTH: 27
<212> TYPE: DNA
<213> ORGANISM: Artificial
<220> FEATURE:
<223> OTHER INFORMATION: primer

<400> SEQUENCE: 13
tcccaagcag ttgatgagtt tcccttc                                        27

<210> SEQ ID NO 14
<211> LENGTH: 26
<212> TYPE: DNA
<213> ORGANISM: Artificial
<220> FEATURE:
<223> OTHER INFORMATION: primer

<400> SEQUENCE: 14
ggactgtctg cttctcaatt ccgccg                                         26

<210> SEQ ID NO 15
<211> LENGTH: 25
<212> TYPE: DNA
<213> ORGANISM: Artificial
<220> FEATURE:
<223> OTHER INFORMATION: primer

<400> SEQUENCE: 15
caggtccgtc atctccttcc agcag                                          25

<210> SEQ ID NO 16
<211> LENGTH: 26
<212> TYPE: DNA
<213> ORGANISM: Artificial
<220> FEATURE:
<223> OTHER INFORMATION: primer

<400> SEQUENCE: 16
ccacatgcga ccgagaatct tggcta                                         26
```